United States Patent [19]
Sakai et al.

[11] Patent Number: 5,630,071
[45] Date of Patent: May 13, 1997

[54] POS SYSTEM HAVING SELF SCANNER AND DISPLAY FOR ISSUING TOTAL NUMBER OF PURCHASED COMMODITIES AFTER EACH FIXED INTERVAL OF TIME

[75] Inventors: Kazuhito Sakai; Tomochika Shibata; Chizuo Suzuki; Chizu Shimizu, all of Kawasaki; Kaoru Kikuchi, Hachioji; Kyouko Terada, Kawasaki, all of Japan

[73] Assignee: Fujitsu Limited, Kawasaki, Japan

[21] Appl. No.: 598,087

[22] Filed: Feb. 7, 1996

Related U.S. Application Data

[63] Continuation of Ser. No. 273,789, Jul. 12, 1994, abandoned.

[30] Foreign Application Priority Data

Nov. 26, 1993 [JP] Japan ................................. 5-296990

[51] Int. Cl.⁶ .................................................. G06F 19/00
[52] U.S. Cl. ........................ 395/221; 395/222; 395/224
[58] Field of Search ..................................... 395/800, 216; 364/401, 405, 483, 408; 235/383, 431, 380, 381

[56] References Cited

U.S. PATENT DOCUMENTS

| | | | |
|---|---|---|---|
| 4,071,740 | 1/1978 | Gogulski | 235/431 |
| 4,310,885 | 1/1982 | Azcua et al. | 364/405 |
| 4,441,160 | 4/1984 | Azcua et al. | 364/900 |
| 4,528,638 | 7/1985 | Hatta et al. | 364/709 |
| 4,729,097 | 3/1988 | Takaoka et al. | 364/405 |
| 4,855,908 | 8/1989 | Shimoda et al. | 364/405 |
| 4,859,838 | 8/1989 | Okiharu | 235/383 |
| 4,877,947 | 10/1989 | Mori | 235/381 |
| 4,901,243 | 2/1990 | Uehara | 364/483 |
| 5,235,509 | 8/1993 | Mueller et al. | 364/405 |
| 5,345,071 | 9/1994 | Dumont | 235/383 |

FOREIGN PATENT DOCUMENTS

| | | |
|---|---|---|
| 52-132651 | 11/1977 | Japan . |
| 58-96367 | 6/1983 | Japan . |
| 63-36119 | 2/1988 | Japan . |
| 63-145591 | 6/1988 | Japan . |
| 63-223998 | 9/1988 | Japan . |
| 2-277412 | 11/1990 | Japan . |
| 3-232079 | 10/1991 | Japan . |
| 4-293198 | 10/1992 | Japan . |
| 2068132 | 8/1981 | United Kingdom . |

OTHER PUBLICATIONS

*Grocery Buggy;* IBM Technical Disclosure Bulletin; vol. 31, No. 6, Nov. 1988; pp. 399–400.
*Plus De Manipulation Ni D'Attente Aux Caisses Des Supermarchés;* Science & Vie; Echos De L'Industrie; No. 884; May 1991.

Primary Examiner—Meng-Ai T. An
Attorney, Agent, or Firm—Armstrong, Westerman, Hattori, McLeland & Naughton

[57] ABSTRACT

A POS (Point Of Sales) system which employs a purchased commodity accommodating and transporting apparatus having a self scanning function is improved in that a total amount of money for commodities loaded on a shopping cart or in a shopping basket or unit prices of the individual commodities can come to a knowledge of a customer before the commodities are transported to a settlement POS terminal thereby to prevent possible shopping of an amount of money greater than an estimate to allow smooth shopping and that commodities are printed in a sorted condition for different groups to facilitate confirmation of purchased commodities by a customer. A display section is provided on the purchased commodity accommodating and transporting apparatus and displays the prices of commodities obtained by retrieval of a commodity price file in accordance with commodity code information read by a commodity code reading section and a total value of the prices of the commodities.

15 Claims, 25 Drawing Sheets

FIG. 5

```
xx(MONTH) xx(DAY)xx YEAR  PM 2:30   MEMBERSHIP NO. xxxx

533  TOFU                    ¥222
532  CHEESE                  ¥399
532  CHEESE                  ¥399
511  GREE BASIL DRESSING     ¥168
511  DRESSING                ¥178
526  SALTY DRY FISH          ¥598
524  HACKBERRY MUSHROOM      ¥280

TOTAL                      ¥2,244
CONSUMPTION TAX                67
GRAND TOTAL                ¥2,311
```

21g

← → END CANCEL 21b 21b 21b 21b

FIG. 10

SUPERMARKET   SOUTH TAMA   XXXX-XX-XXXX   No123456789012
FUJITSU       STORE

TOFU                  2   ￥128
×××CHEESE             1   ￥368
GREEN BASIL DRESSING  1   ￥252
EGG L                 1   ￥168
HACKBERRY MUSHROOM    2   ￥124
CABBAGE L             1   ￥158

VERY SURPRISING BARGAIN

FRESH FISH CORNER

ALL GOODS 30 PERCENT
DISCOUNT

TOTAL            ￥1,204
CONSUMPTION TAX  ￥36
GRAND TOTAL      ￥1,240

| CATEGORY CODE OF SCANNED COMMODITY | CATEGORY CODES OF ASSOCIATED COMMODITIES |
|---|---|
| 1 | 3, 13, 21, 23 |
| 14 | 4, 6, 16, 24, 26 |
| 27 | 16, 17, 26, 29, 45, 48 |
| ⋮ | ⋮ |

FIG. 15
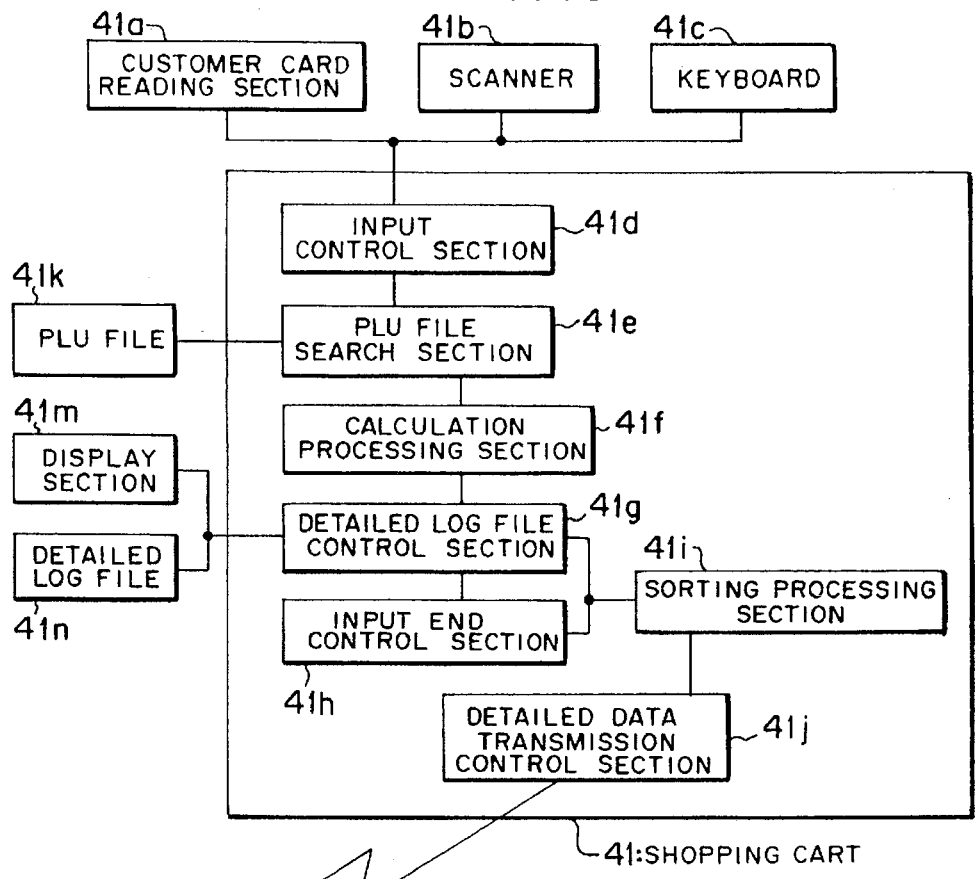
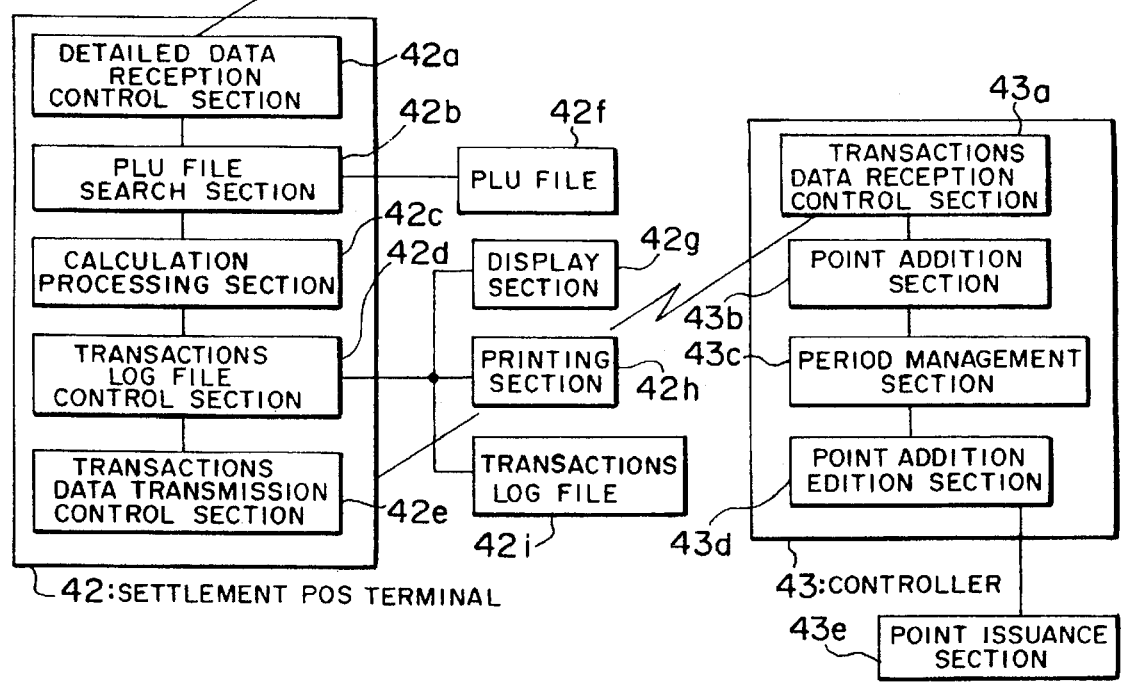

FIG. 16

```
       AUGUST 25, 1993    PM 2:30
No930123456      TO TSUKO FUJI
512   RAISINS                    ¥100
512   RICE COOKIE/PEANUT         ¥100
511   MIRIN-LIKE SWEETENING      ¥120
524   ONION                       ¥80
512   STRAWBERRY JAM              ¥95
512   PEANUT CUP                 ¥105
511   K KETCHUP 5                ¥248
524   ASPARAGUS                  ¥150
─────────────────────────────────────
TOTAL                            ¥998
CONSUMPTION TAX                   ¥29
GRAND TOTAL                    ¥1,027
```

COMMODITY INPUTTING ORDER ↓

FIG. 17

```
       AUGUST  25, 1993    PM 2:45
No930123456
511   MIRIN-LIKE SWEETENING      ¥120
511   K KETCHUP 5                ¥248
512   RAISINS                    ¥100
512   RICE COOKIE/PEANUT         ¥100
512   STRAWBERRY JAM              ¥95
512   PEANUT CUP                 ¥105
524   ONION                       ¥80
524   ASPARAGUS                  ¥150
─────────────────────────────────────
TOTAL(CONSUMPTION TAX         ¥1,027
      INCLUDED)
CASH                          ¥1,030
CHANGE                            ¥3
```

ORDER OF CATEGORY NUMBER FROM SMALLEST SIDE AFTER SORTING ↓

FIG. 18

```
××MONTH ××DAY ××YEAR  No930123456
              PM 2:45
           THANK YOU (SEASONINGS)
    MIRIN-LIKE SWEETENING    ¥120
    K KETCHUP 5              ¥248

(CONFECTIONERY SNACKS)
    RAISINS                  ¥100
    RICE COOKIE / PEANUT     ¥109
    STRAWBERRY JAM            ¥95
    PEANUT CUP               ¥105

(VEGETABLES)
    ONION                     ¥80
    ASPARAGUS                ¥150

TOTAL (CONSUMPTION TAX
         INCLUDED)         ¥1,027
```

ORDER OF CATEGORY NUMBER FROM SMALLEST SIDE AFTER SORTING

FIG. 19

```
NOTICE ON PURCHASE POINTS IN xx MONTH, xx YEAR

MEMBERSHIP No.930123456
    NAME OF MEMBER: Ms. Tsuko Fuji

THANK YOU FOR YOUR PURCHASE.
    TOTAL AMOUNT OF PURCHASE IN AUGUST
                                    ¥11,520.-

POINTS  120 POINTS
```

FIG. 24

NOTIFICATION ON PURCHASE IN AUGUST, 1993
MEMBERSHIP No. 930123456
NAME OF MEMBER Ms. TSUKO FUJI

THANK YOU FOR YOUR PURCHASE

[012: GOODS OF BEANS. KONNYAKU]

| PURCHASE DATE | COMMODITY NAME | UNIT PRICE | QUANTITY | AMOUNT OF MONEY |
|---|---|---|---|---|
| 8/1 | OKAME FERMENTED SOYBEANS | ¥33 | 3 | ¥99 |
| 8/3 | TOFU | ¥50 | 3 | ¥150 |
| | TOTAL ¥1,652 (CONSUMPTION TAX INCLUDED) | | | |

[055: MEAT. FISH]

| PURCHASE DATE | COMMODITY NAME | UNIT PRICE | QUANTITY | AMOUNT OF MONEY |
|---|---|---|---|---|
| 8/3 | RED SALMON (2 CUTS) | ¥358 | 1 | ¥358 |
| 8/3 | PORK | ¥320 | 1 | ¥320 |
| 8/5 | ROUGHLY MINCED MEAT | ¥235 | 1 | ¥235 |
| 8/12 | RED SALMON (2 CUTS) | ¥402 | 2 | ¥804 |
| | TOTAL ¥3,150 (CONSUMPTION TAX INCLUDED) | | | |

[512: SNACKS. CONFECTIONERY]

| PURCHASE DATE | COMMODITY NAME | UNIT PRICE | QUANTITY | AMOUNT OF MONEY |
|---|---|---|---|---|
| 8/5 | RAISINS | ¥100 | 1 | ¥100 |
| 8/25 | RICE COOKIE/PEANUT | ¥100 | 1 | ¥100 |
| | TOTAL ¥1,224 (CONSUMPTION TAX INCLUDED) | | | |

PURCHASE IN AUGUST TOTAL ¥11,520 - POINT: 120 POINTS

POS SYSTEM HAVING SELF SCANNER AND DISPLAY FOR ISSUING TOTAL NUMBER OF PURCHASED COMMODITIES AFTER EACH FIXED INTERVAL OF TIME

This application is a continuation of application Ser. No. 08/273,789 filed Jul. 12, 1994, now abandoned.

BACKGROUND OF THE INVENTION

1) Field of the Invention

This invention relates to a POS system which employs a purchased commodity accommodating and transporting apparatus having a self scanning function such as a shopping cart (hand cart) or a shopping basket for use in the distribution industry, particularly in a store such a mass sales store, a convenience store or a supermarket to allow a customer to accommodate and transport a purchased commodity in order to purchase the commodity while the customer itself reads a commodity code such as a bar code applied to the commodity.

2) Description of the Related Art

Generally, a POS system is used in various stores (such as, supermarkets and convenience stores). In the POS system, a customer walks around in a store pushing a shopping cart or carrying a shopping basket, places commodities to be purchased into the shopping cart or the shopping basket, and comes to a settlement POS terminal (POS register).

Then at the settlement POS terminal, an operator takes out the commodities one by one from the shopping cart or the shopping basket and reads the bar codes (commodity codes) applies to the commodities by means of a scanner to effect registration processing. In particular, in accordance with commodity code information read from each bar code, the price of the commodity corresponding to the commodity code is retrieved from a commodity price file (PLU (Price Look UP) file), and a total amount of money of the purchased commodities is calculated to settle the accounts.

With such POS system, however, since an operator must perform a reading operation of a commodity code of each commodity, much time is required for such reading operation and a settling operation, which causes the customer to wait for a long time. Accordingly, in a time band in which customers are crowded, a queue of customers is produced in front of a settlement POS terminal, and besides, the burden on the operator is heavy.

Thus, in recent years, a shopping cart (scanning cart) or a shopping basket having a scanner (commodity code reading section) for reading a bar code (commodity code) applied to a commodity has been developed and are disclosed in various publications including, for example, Japanese Patent Laid-Open Applications No. Showa 63-145591, No. Heisei 2-277412 and No. Heisel 5-81559.

In a POS system which employs a shopping cart or a shopping basket of the type mentioned, a customer itself reads a bar code applied to a commodity to be purchased by means of the scanner to register the commodity code information and places or accommodates the commodity into an accommodating section of the shopping cart or the shopping basket, and then after selection of commodities to be purchased is completed, the commodities are placed into the shopping cart or the shopping basket and transported to a settlement POS terminal.

Then at the settlement POS terminal, the commodity code information (or commodity price information corresponding to the commodity code information) registered by the customer itself is loaded down, and a total amount of money of the purchased commodities is calculated based on the commodity code information (commodity price information) to effect settlement of the accounts.

With the POS system, an operator no more need read the commodity codes of commodities one by one, and the time (register operation time) required for reading processing and settling processing can be reduced significantly. Consequently, the customer need not wait for a long time, and the burden on the operator can be remarkably reduced.

With such a conventional POS system as described above, however, since it does not have means by which a total amount of money or individual unit prices of commodities loaded on a shopping cart or in a shopping basket comes to a knowledge of a customer before the commodities are transported to a settlement POS terminal, the customer cannot prepare an amount of money for settlement of accounts in advance and may possibly try to buy commodities of an amount of money greater than its estimate. Accordingly, the conventional POS system has a subject to be solved in that shoppping cannot be performed smoothly or without anxiety.

Further, in this instance, an operator must perform a procedure of returning excessive commodities upon settlement of accounts. Accordingly, there is another subject to be solved in that the labor of the operator is increased as much.

Furthermore, since commodity code information is loaded down, at a settlement POS terminal, in order of commodities inputted by the customer, printing on a receipt upon settlement of accounts occurs in order of the inputs by the customer. Consequently, the commodities on the receipt are not classified for individual groups. Accordingly, there is a further subject to be solved in that much time is required for the customer to confirm the thus purchased commodities and it is cumbersome to keep a record of household accounts in accordance with the receipt.

SUMMARY OF THE INVENTION

It is an object of the present invention to provide a POS system by which for commodities loaded on a shopping cart or in a shopping basket or unit prices of the individual commodities can be provided to a customer before the commodities are transported to a settlement POS terminal amount of money greater than an estimate.

It is another object of the present invention to provide a POS system wherein commodities are printed in a sorted condition for different groups to facilitate confirmation of purchased commodities by a customer.

In order to attain the objects described above, according to an aspect of the present invention, there is provided a POS system which comprises a purchased commodity accommodating and transporting apparatus having a self scanning function and including a commodity code reading section for reading a commodity code applied to a commodity, and an accommodation section for accommodating therein a commodity whose commodity code has been read by the commodity code reading section, a commodity price file for accommodating price information of commodities corresponding to commodity codes, a settlement POS terminal for performing final settlement of accounts for purchased commodities accommodated in the accommodation section of the purchased commodity accommodating and transporting apparatus, a control apparatus for controlling the purchased commodity accommodating and transporting apparatus and the settlement POS terminal, and a display section provided on the purchased commodity accommodating and transporting apparatus for displaying prices of commodities obtained by retrieval of the commodity price file in accordance with commodity code information read by the commodity code reading section and a total value of the prices of the commodities.

The purchased commodity accommodating and transporting apparatus may include the commodity price file therein.

The control apparatus may include a commodity price retrieval section for retrieving, in accordance with commodity code information read by the commodity code reading section of the purchased commodity accommodating and transporting apparatus, a price of a commodity corresponding to the commodity code information from the commodity price file, a total amount calculation section for calculating a total value of prices of commodities retrieved by the commodity price retrieval section, a screen data edition section for editing a screen which includes, as display information, the prices of the commodities retrieved by the commodity price retrieval section and the total value of the prices of the commodities calculated by the total amount calculation section, and a screen data transmission section for transmitting the edited screen edited by the screen data edition section to the purchased commodity accommodating and transporting apparatus, and the purchased commodity accommodating and transporting apparatus may include a screen data reception section for receiving the screen data transmitted thereto from the screen data transmission section of the control apparatus, the display section of the purchased commodity accommodating and transporting apparatus displaying the edited screen received by the screen data reception section. In this instance, the control apparatus may further include a purchased commodity data storage section for storing edited screen information edited by the screen data edition section as purchased commodity data of the purchased commodity accommodating and transporting apparatus, and a data transmission section for transmitting the purchased commodity data stored in the purchased commodity data storage section to the settlement POS terminal in response to a request from the settlement POS terminal.

The purchased commodity accommodating and transporting apparatus may include a screen information holding section for holding information of a plurality of particular screens, and a display control section for controlling the display section to display the information of at least one of the plurality of particular screens held in the screen information holding section by window display. In this instance, the information of the plurality of particular screens held in the screen information holding section may be read in from the control apparatus or from an external storage medium loaded on the purchased commodity accommodating and transporting apparatus. Further, the purchased commodity accommodating and transporting apparatus may further include a screen information retrieval section for retrieving from the screen information holding section the information of that one of the particular screens which relates to commodity code information read by the commodity code reading section, the information of the particular screen retrieved by the screen information retrieval section being displayed by window display on the display section under the control of the display control section. In this instance, the screen information holding section may be constructed as a group information holding section which holds, for each of a plurality of commodity categories to which commodities belong, information of a plurality of particular screens relating to the commodity category as a group, and the screen information retrieval section may retrieve, from the group information holding section, that one of the groups of information of particular screens which relates to a commodity category to which commodity code information read by the commodity code reading section belongs whereas the display control section controls the display section to successively display the information of the particular screens of the particular screen information group by window display.

The purchased commodity accommodating and transporting apparatus may include an inputting section for inputting a purchase estimate of a customer when the customer starts use of the purchased commodity accommodating and transporting apparatus, a comparison section for comparing the purchase estimate inputted from the inputting section and the total value of the prices of the commodities, and an excess notification section operable when it is determined by the comparison section that the total value of the prices of the commodities exceeds the purchase estimate inputted from the inputting section for causing the display section to display the determination in order to notify the determination to the customer. In this instance, the inputting section is constructed as ten keys of the touch sensor type displayed on the display section.

According to another aspect of the present invention, there is provided a POS system which comprises a purchased commodity accommodating and transporting apparatus having a self scanning function and including a commodity code reading section for reading a commodity code applied to a commodity, and an accommodation section for accommodating therein a commodity whose commodity code has been read by the commodity code reading section, a commodity price file for accommodating price information of commodities corresponding to commodity codes, a settlement POS terminal for performing final settlement of accounts for purchased commodities accommodated in the accommodation section of the purchased commodity accommodating and transporting apparatus, the settlement POS terminal including a receipt issuance section for issuing a result of the settlement of accounts as a receipt, a control apparatus for controlling the purchased commodity accommodating and transporting apparatus and the settlement POS terminal, and a sorting processing section for sorting, at a point of time when reading of commodity codes by the commodity code reading section of the purchased commodity accommodating and transporting apparatus is completed, purchased commodity data regarding prices of the commodities obtained by retrieval of the commodity price file in accordance with the commodity code information read by the commodity code reading section into commodity categories to which the commodities belong, the receipt issuance section of the settlement POS terminal issuing a result of the sorting processing by the sorting processing section as a receipt.

The sorting processing section may be provided in the control apparatus and the control apparatus may include a data transmission section for transmitting the result of the sorting processing by the sorting processing section to the settlement POS terminal. In this instance, the purchased commodity accommodating and transporting apparatus may include a customer information inputting section for inputting information unique to a customer who utilizes the purchased commodity accommodating and transporting apparatus, and the control apparatus may include a purchased commodity data storage section for storing, for unique information to each customer from the customer information inputting section of the purchased commodity accommodating and transporting apparatus, purchased commodity data of the customer in accordance with the result of the sorting by the sorting processing section, a period determination section for determining lapse of a fixed period of time, and a purchased commodity data issuance section operable when it is determined by the period determination section that the fixed period of time has elapsed for issuing purchased commodity data for the fixed period of time stored in the purchased commodity data storage section in accordance with the unique information of the customer. Alternatively, the purchased commodity accommodating and transporting apparatus may include a customer information inputting section for inputting information unique to a customer who utilizes the purchased commodity accommodating and transporting apparatus, and the control apparatus may include a point number storage section for converting, for unique information to each customer from the customer information inputting section of the purchased commodity accommodating and transporting apparatus, a total amount of money for each one transaction of the customer into a point number and cumulatively storing the point number, a period determination section for determining lapse of a fixed period of time, and a point number issuance section operable when it is determined by the period determination section that the fixed period of time has elapsed for issuing a total point number for the fixed period of time stored in the point storage section in a corresponding relationship to the peculiar information of the customer. In this instance, the control apparatus may include a purchased commodity data storage section for storing, for unique information to each customer from the customer information inputting section of the purchased commodity accommodating and transporting apparatus, purchased commodity data of the customer in accordance with the result of the sorting by the sorting processing section, and a purchased commodity data issuance section operable when it is determined by the period determination section that the fixed period of time has elapsed for issuing purchased commodity data for the fixed period of time stored in the purchased commodity data storage section in accordance with the unique information of the customer.

The sorting processing section may be provided in the purchased commodity accommodating and transporting apparatus, and the purchased commodity accommodating and transporting apparatus may include a data transmission section for transmitting the result of the sorting processing by the sorting processing section to the settlement POS terminal. In this instance, the commodity price file may be provided in the purchased commodity accommodating and transporting apparatus. The purchased commodity accommodating and transporting apparatus may include a customer information inputting section for inputting unique information to a customer who utilizes the purchased commodity accommodating and transporting apparatus, and the control apparatus includes a point number storage section for converting, for unique information to each customer from the customer information inputting section of the purchased commodity accommodating and transporting apparatus, a total amount of money for each one transaction of the customer into a point number and cumulatively storing the point number, a period determination section for determining lapse of a fixed period of time, and a point number issuance section operable when it is determined by the period determination section that the fixed period of time has elapsed for issuing a total point number for the fixed period of time stored in the point storage section in a corresponding relationship to the unique information of the customer.

The POS systems of the present invention having the constructions described above are advantageous in the following points:

1. Since a total amount of money for purchased commodities is displayed even during shopping of a customer, shopping of an amount of money greater than an estimate by the customer can be prevented and an amount of money required for settlement of accounts can be prepared in advance, which is effective to reduce the time required for settlement of accounts.

2. Since a receipt printed at a settlement POS terminal has indications of purchased commodities which are sorted for different categories to which they belong, the receipt can be used as it is as a record of household accounts.

3. Since purchased commodity data can be issued, for each fixed period of time, in a form arranged for different categories to which the commodities belong, a customer can acquire statistic data to be placed into a record of household accounts, which is convenient to the customer.

4. Since a point number calculated by conversion of a total amount of money for purchased commodities can be issued after each fixed interval of time, better services can be provided to a customer.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 5 is an illustration showing an example of a display by a display section of the shopping cart shown in FIG. 4;

FIG. 10 is an illustration showing an example of a window display by a display section of the POS system shown in FIG. 9;

FIG 15 is a block diagram of a further POS system showing a third preferred embodiment of the present invention;

FIG. 16 is an illustration showing an example of a display on a display section of a shopping cart employed in the POS system shown in FIG. 15;

FIG. 17 is a similar view but showing an example of a display on a display section section of a settlement POS terminal in the POS system shown in FIG. 15;

FIG. 18 is a similar view but showing an example of a print by a printing section of the settlement POS terminal in the POS system shown in FIG. 15;

FIG. 19 is an illustration showing an example of a point number issuance print by a point issuance section in the POS system shown in FIG. 15;

FIG. 24 is an illustration showing a result of totalization of purchased commodities by a controller of the POS system shown in FIG. 23;

DESCRIPTION OF THE PREFERRED EMBODIMENTS a. Aspects of the Invention

Figure 1:
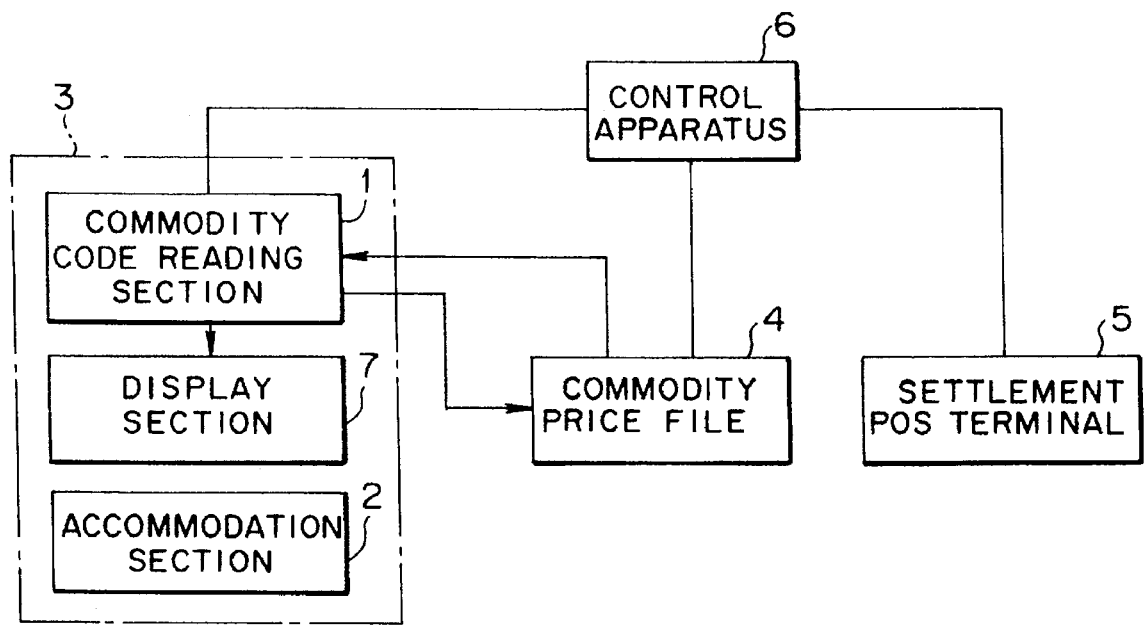
FIGS. 1 and 2 are block diagrams illustrating different aspects of the present invention.

FIG. 1 shows a POS system according to an aspect of the present invention. Referring to FIG. 1, the POS system includes a purchased commodity accommodating and transporting apparatus 3 having a self scanning function. The purchased commodity accommodating and transporting apparatus 3 includes a commodity code reading section 1 for reading a commodity code applied to a commodity, an accommodation section 2 for accommodating therein a commodity whose commodity code has been read by the commodity code reading section 1, and a display section 7 for displaying prices of commodities obtained by retrieval of a commodity price file 4 in accordance with commodity code information read by the commodity code reading section 1 and a total value of the prices of the commodities. The purchased commodity accommodating and transporting apparatus 3 further includes a screen data reception section for receiving screen data transmitted thereto from screen data transmission section of a control apparatus 6 which will be hereinafter described.

The POS system further comprises a commodity price file 4 for accommodating price information of commodities corresponding to commodity codes, and a settlement POS terminal 5 for performing final settlement of accounts for purchased commodities accommodated in the accommodation section 2 of the purchased commodity accommodating and transporting apparatus 3.

The POS system further comprises a control apparatus 6 for controlling the purchased commodity accommodating and transporting apparatus 3 and the settlement POS terminal 5. The control apparatus 6 includes a commodity price retrieval section for retrieving, in accordance with commodity code information read by the commodity code reading section 1 of the purchased commodity accommodating and transporting apparatus 3, a price of a commodity corresponding to the commodity code information from the commodity price file 4, a total amount calculation section for calculating a total value of prices of commodities retrieved by the commodity price retrieval section, a screen data edition section for editing a screen which includes, as display information, the prices of the commodities retrieved by the commodity price retrieval section and the total value of the prices of the commodities calculated by the total amount calculation section, and a screen data transmission section for transmitting the edited screen edited by the screen data edition section to the purchased commodity accommodating and transporting apparatus 3.

Consequently, the display section 7 of the purchased commodity accommodating and transporting apparatus 3 displays the edited screen received by the screen data reception section.

The control apparatus 6 may include a purchased commodity data storage section for storing the edited screen information edited by the screen data edition section as purchased commodity data of the purchased commodity accommodating and transporting apparatus 3, and a data transmission section for transmitting the purchased commodity data stored in the purchased commodity data storage section to the settlement POS terminal 5 in response to a request from the settlement POS terminal 5.

The purchased commodity accommodating and transporting apparatus 3 may include a screen information holding section for holding information of a plurality of particular screens, and a display control section for controlling the display section 7 to display the information of at least one of the plurality of particular screens held in the screen information holding section by window display.

The information of the plurality of particular screens held in the screen information holding section may be read in from the control apparatus 6 or alternatively from an external storage medium loaded on the purchased commodity accommodating and transporting apparatus 3.

The purchased commodity accommodating and transporting apparatus 3 may include a screen information retrieval section for retrieving from the screen information holding section the information of that one of the particular screens which relates to commodity code information read by the commodity code reading section 1. Thus, the information of the particular screen retrieved by the screen information retrieval section is displayed by window display on the display section 7 under the control of the display control section.

Where the screen information holding section is constructed as a group information holding section which holds, for each of a plurality of commodity categories to which commodities belong, information of a plurality of particular screens relating to the commodity category as a group, the screen information retrieval section may retrieve, from the group information holding section, that one of the groups of information of particular screens which relates to a commodity category to which commodity code information read by the commodity code reading section 1 belong whereas the display control section controls the display section 7 to successively display the information of the particular screens of the particular screen information group by window display.

Further, the purchased commodity accommodating and transporting apparatus 3 may include an inputting section for inputting a purchase estimate of a customer when the customer starts use of the purchased commodity accommodating and transporting apparatus 3, a comparison section for comparing the purchase estimate inputted from the inputting section and the total value of the prices of the commodities, and an excess notification section operable when it is determined by the comparison section that the total value of the prices of the commodities exceeds the purchase estimate inputted from the inputting section for causing the display section 7 to display the determination in order to notify the determination to the customer.

The inputting section may be constructed as ten keys of the touch sensor type displayed on the display section 7.

In the POS system of the present invention described above, when the commodity code reading section 1 of the purchased commodity accommodating and transporting apparatus 3 reads a commodity code applied to a commodity, the control apparatus 6 retrieves, in accordance with the commodity code information read by the commodity code reading section 1 of the purchased commodity accommodating and transporting apparatus 3, the price of the commodity corresponding to the commodity code information from the commodity price file 4. The control apparatus 6 then calculates the total value of the thus retrieved prices of such commodities and edits a screen which includes the prices of the commodities and the total value of the prices as display information. The control apparatus 6 transmits the thus edited screen to the purchased commodity accommodating and transporting apparatus 3.

Consequently, the display section 7 displays, with the thus received edited screen, the prices of the commodities obtained by retrieval of the commodity price file 4 in accordance with the commodity code information read by the commodity code reading section 1 and the total value of the prices of the commodities.

Thereafter, the settlement POS terminal 5 performs final settlement of accounts for the purchased commodities accommodated in the accommodation section 2 of the purchased commodity accommodating and transporting apparatus 3.

It is to be noted that the control apparatus 6 can store the edited screen information edited by the screen data edition section as purchased commodity data with the purchased commodity accommodating and transporting apparatus 3 and transmit the purchased commodity data to the settlement POS terminal 5 in response to a request from the settlement POS terminal 5.

Further, the purchased commodity accommodating and transporting apparatus 3 can hold information of a plurality of particular screens read in from the control apparatus 6 or an external storage medium loaded on the purchased commodity accommodating and transporting apparatus 3 and display the information of at least one of the plurality of particular screens thus held by window display on the display section 7 which displays the prices of the commodities and the total value of the prices.

Furthermore, the purchased commodity accommodating and transporting apparatus 3 retrieves the information of a particular screen relating to commodity code information read by the commodity code reading section 1, that is, a particular screen information group relating to a commodity category to which the commodity code information belongs. The information of particular screens of the thus retrieved particular screen information group is successively displayed by window display on the display section 7.

Further, when a customer starts use of the purchased commodity accommodating and transporting apparatus 3, a purchase estimate of the customer is inputted to the purchased commodity accommodating and transporting apparatus 3, and the thus inputted purchase estimate and the total value of the prices of the commodities are compared with each other. Then, when the total value of the prices of the commodities exceeds the inputted purchase estimate, this is displayed on the display section 7 so that it may be notified to the customer.

Figure 2:
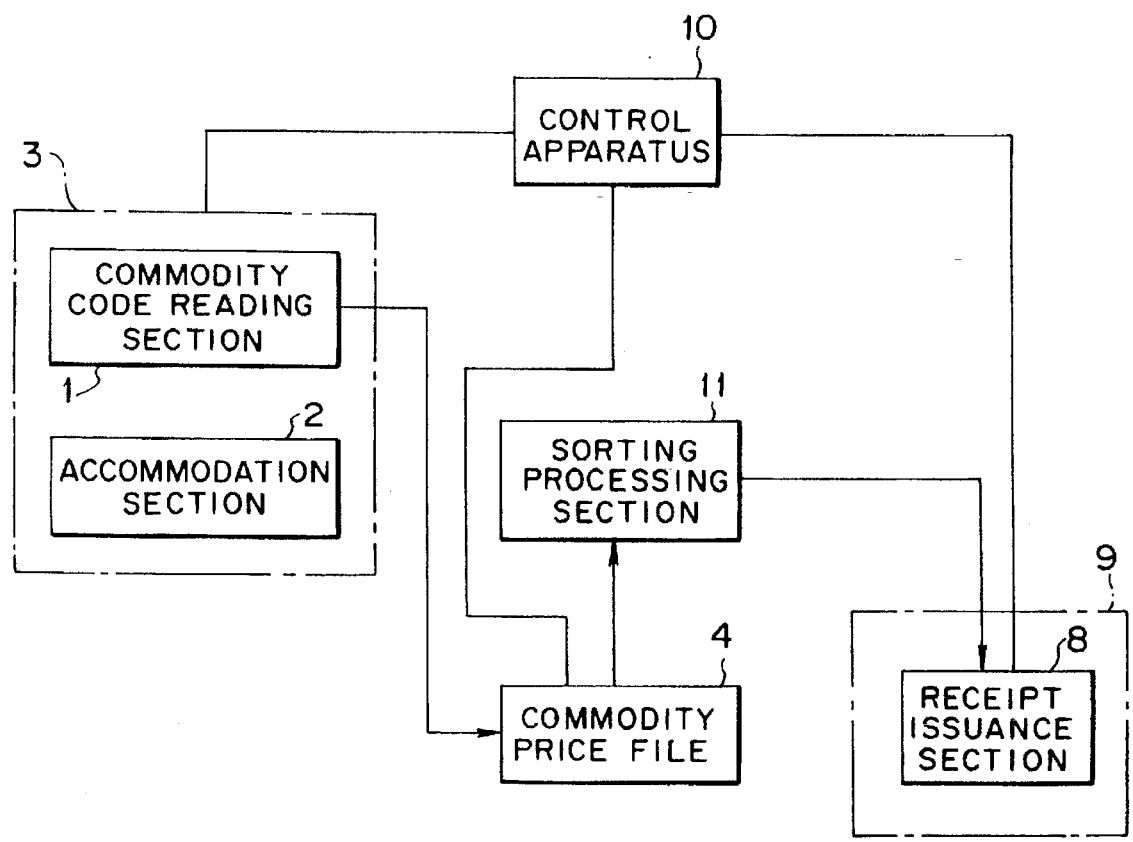

FIG. 2 shows a POS system according to another aspect of the present invention. Referring to FIG. 2, the POS system comprises a purchased commodity accommodating and transporting apparatus 3 having a self scanning function. The purchased commodity accommodating and transporting apparatus 3 includes a commodity code reading section 1 for reading a commodity code applied to a commodity, and an accommodation section 2 for accommodating therein a commodity whose commodity code has been read by the commodity code reading section 1. The POS system further comprises a commodity price file 4 for accommodating price information of commodities corresponding to commodity codes, and a settlement POS terminal 9 for performing final settlement of accounts for purchased commodities accommodated in the accommodation section 2 of the purchased commodity accommodating and transporting apparatus 3. The settlement POS terminal 9 includes a receipt issuance section 8 for issuing a result of the settlement of accounts as a receipt. The POS system further comprises a control apparatus 10 for controlling the purchased commodity accommodating and transporting apparatus 3 and the settlement POS terminal 9.

The POS system further comprises a sorting processing section 11 which sorts, at a point of time when reading of commodity codes by the commodity code reading section 1 of the purchased commodity accommodating and transporting apparatus 3 is completed, purchased commodity data regarding prices of the commodities obtained by retrieval of the commodity price file 4 in accordance with the commodity code information read by the commodity code reading section 1 into commodity categories to which the commodities belong.

Consequently, the receipt issuance section 8 of the settlement POS terminal 9 issues a result of the sorting processing by the sorting processing section 11 as a receipt.

The sorting processing section 11 may be provided in the control apparatus 10, and the control apparatus 10 may include a data transmission section for transmitting the result of the sorting processing by the sorting processing section 11 to the settlement POS terminal 9. In this instance, the purchased commodity accommodating and transporting apparatus 3 includes a customer information inputting section for inputting information unique to a customer who utilizes the purchased commodity accommodating and transporting apparatus 3, and the control apparatus 10 includes a purchased commodity data storage section for storing, for unique information to each customer from the customer information inputting section of the purchased commodity accommodating and transporting apparatus 3, purchased commodity data of the customer in accordance with the result of the sorting by the sorting processing section 11, a period determination section for determining lapse of a fixed period of time, and a purchased commodity data issuance section operable when it is determined by the period determination section that the fixed period of time has elapsed for issuing purchased commodity data for the fixed period of time stored in the purchased commodity data storage section in accordance with the unique information of the customer.

The purchased commodity accommodating and transporting apparatus 3 may include a customer information inputting section for inputting information unique to a customer who utilizes the purchased commodity accommodating and transporting apparatus 3, and the control apparatus 10 may include a point number storage section for converting, for unique information to each customer from the customer information inputting section of the purchased commodity accommodating and transporting apparatus 3, a total amount of money for each one transaction of the customer into a point number and cumulatively storing the point number, a period determination section for determining lapse of a fixed period of time, and a point number issuance section operable when it is determined by the period determination section that the fixed period of time has elapsed for issuing a total point number for the fixed period of time stored in the point storage section in a corresponding relationship to the peculiar information of the customer. With the POS system, a total point number obtained by conversion of a total amount of money for purchased commodities for the fixed period of time can be issued for unique information to each customer. The control apparatus 10 may further include a purchased commodity data storage section for storing, for unique information to each customer from the customer information inputting section of the purchased commodity accommodating and transporting apparatus 3, purchased commodity data of the customer in accordance with the result of the sorting by the sorting processing section 11, and a purchased commodity data issuance section operable when it is determined by the period determination section that the fixed period of time has elapsed for issuing purchased commodity data for the fixed period of time stored in the purchased commodity data storage section in accordance with the unique information of the customer. With the POS system, purchased commodity data for the fixed period of time and a total point number obtained by conversion of a total amount of money for purchased commodities for the fixed period of time can be issued for unique information to each customer.

The sorting processing section 11 may be provided in the purchased commodity accommodating and transporting apparatus 3, and the purchased commodity accommodating and transporting apparatus 3 may include a data transmission section for transmitting the result of the sorting processing by the sorting processing section 11 to the settlement POS terminal 9. In this instance, the purchased commodity accommodating and transporting apparatus 3 may include a customer information inputting section for inputting unique information to a customer who utilizes the purchased commodity accommodating and transporting apparatus 3, and the control apparatus 10 may include a point number storage section for converting, for unique information to each customer from the customer information inputting section of the purchased commodity accommodating and transporting apparatus 3, a total amount of money for each one transaction of the customer into a point number and cumulatively storing the point number, a period determination section for determining lapse of a fixed period of time, and a point number issuance section operable when it is determined by the period determination section that the fixed period of time has elapsed for issuing a total point number for the fixed period of time stored in the point storage section in a corresponding relationship to the peculiar information of the customer. With the POS system, a total point number obtained by conversion of a total amount of money for purchased commodities for the fixed period of time can be issued for unique information to each customer.

In the POS system described above with reference to FIG. 2, the commodity code reading section 1 of the purchased commodity accommodating and transporting apparatus 3 reads a commodity code applied to a commodity. When reading of commodity codes by the commodity code reading section 1 of the purchased commodity accommodating and transporting apparatus 3 is completed, the sorting processing section 11 sorts the purchased commodity data regarding the prices of the commodities obtained by retrieval of the commodity price file 4 in accordance with the commodity code information read by the commodity code reading section 1 into commodity categories to which the commodities belong.

On the other hand, the settlement POS terminal 9 performs final settlement of accounts for the purchased commodities accommodated in the accommodation section 2 of the purchased commodity accommodating and transporting apparatus 3 and issues a result of settlement of accounts as a receipt. The control apparatus 10 controls the purchased commodity accommodating and transporting apparatus 3 and the settlement POS terminal 9.

At the settlement POS terminal 9, the result of the sorting operation by the sorting processing section 11 is issued as a receipt.

Where the sorting processing section 11 is provided in the control apparatus 10, the control apparatus 10 transmits the result of the sorting processing by the sorting processing section 11 to the settlement POS terminal 9. Further, unique information to the customer who utilizes the purchased commodity accommodating and transporting apparatus 3 is inputted to the purchased commodity accommodating and transporting apparatus 3, and the control apparatus 10 stores, for the unique information to the customer from the purchased commodity accommodating and transporting apparatus 3, purchased commodity data of the customer in a corresponding relationship to the result of the sorting by the sorting processing section 11. Further, when the fixed period of time elapses, such purchased commodity data for the fixed period of time are issued for the unique information to the customer.

Further, if unique information to the customer who utilizes the purchased commodity accommodating and transporting apparatus 3 is inputted to the purchased commodity accommodating and transporting apparatus 3 and the control apparatus 10 converts, for the unique information to the customer of the purchased commodity accommodating and transporting apparatus 3, the total amount of money for purchased commodities for each one transaction of the customer into a point number, whereafter it is determined that the fixed period of time has elapsed, then a total point number for the fixed period of time is issued. Further, purchased commodity data for the fixed period of time and the total point number obtained by conversion of the total amount of money for the purchased commodities for the fixed period of time can be issued for the unique information to the customer.

On the other hand, where the sorting processing section 11 is provided on the purchased commodity accommodating and transporting apparatus 3, the purchased commodity accommodating and transporting apparatus 3 transmits a result of the sorting processing by the sorting processing section 11 to the settlement POS terminal 9. Further, if unique information to the customer who utilizes the purchased commodity accommodating and transporting apparatus 3 is inputted to the purchased commodity accommodating and transporting apparatus 3 and the control apparatus 10 converts, for the unique information to the customer from the purchased commodity accommodating and transporting apparatus 3, a total amount of money for purchased commodities for each one transaction of the customer into a point number, whereafter the fixed period of time elapses, a total point number for the fixed period of time is issued for the unique information to the customer.

The POS systems of the present invention having the constructions described above are advantageous in the following points:

1. Since a total amount of money for purchased commodities is displayed even during shopping of a customer, shopping of an amount of money greater than an estimate by the customer can be prevented and an amount of money required for settlement of accounts can be prepared in advance. Accordingly, there is an advantage in that the time required for settlement of accounts can be reduced.

2. Since a receipt printed at a settlement POS terminal has indications of purchased commodities which are sorted for different categories to which they belong, the receipt can be used as it is as a record of household accounts. Accordingly, there is another advantage in that such receipt can be utilized effectively by the customer.

3. Since purchased commodity data can be issued, for each fixed period of time, in a form arranged for different categories to which the commodities belong by the control apparatus, a customer can acquire statistic data to be placed into a record of household accounts. Accordingly, there is a further advantage in that such static data can be obtained readily.

4. Since a point number calculated by conversion of a total amount of money for purchased commodities can be issued after each fixed interval of time, there is a still further advantage in that better services can be provided to a customer.

b. First Embodiment

Figure 3:
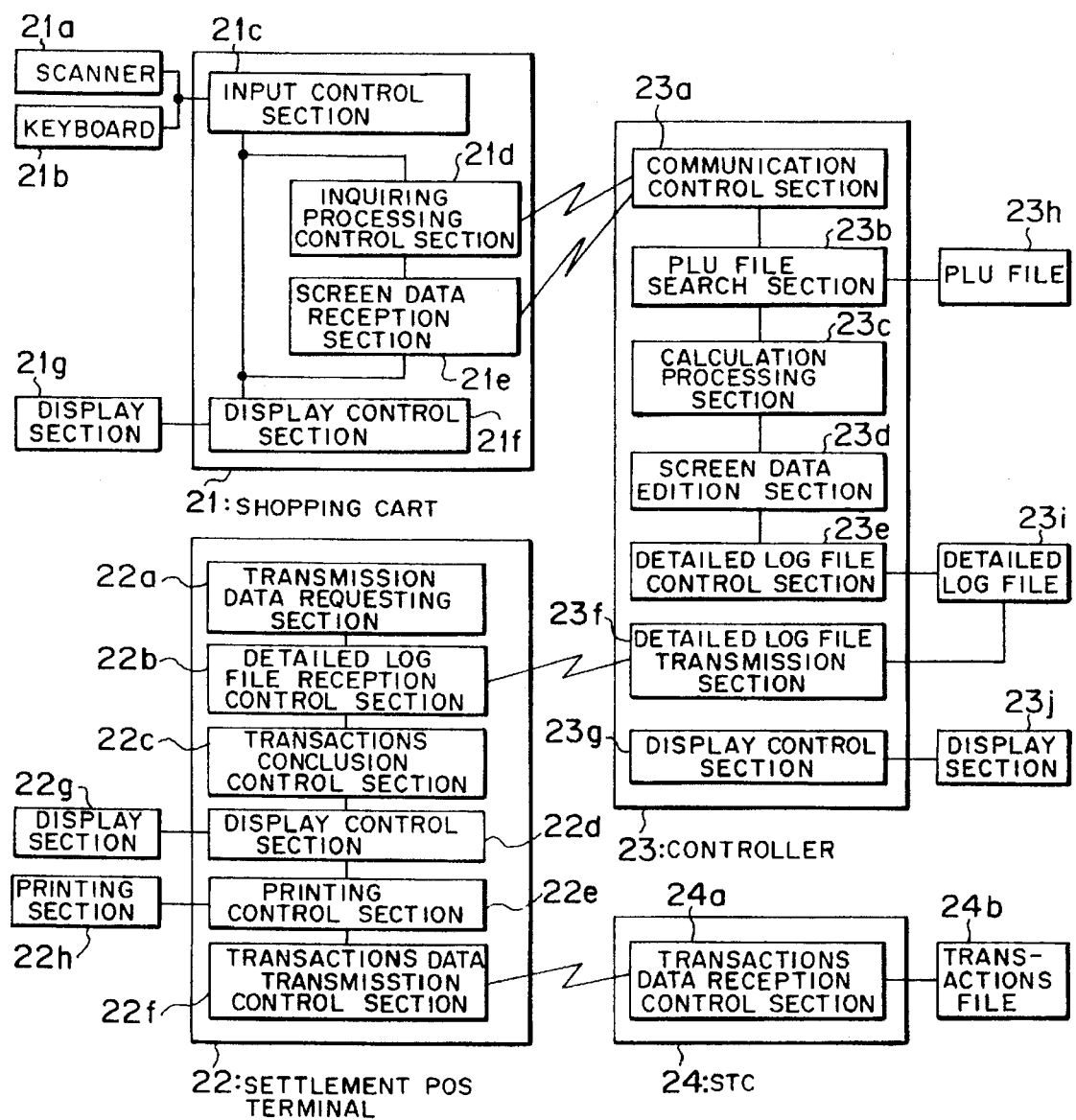
FIG. 3 is a block diagram of a POS system showing a first preferred embodiment of the present invention.

Referring now to FIG. 3, there is shown a POS system according to a first preferred embodiment of the present invention. The POS system shown includes at least one purchased commodity accommodating and transporting apparatus 21, at least one settlement POS terminal 22, a controller 23, and a store controller (STC) 24.

The purchased commodity accommodating and transporting apparatus 21 may be a shopping cart (hand cart), a shopping basket or a like member for accommodating and transporting purchased commodity in a store. Normally, a plurality of such purchased commodity accommodating and transporting apparatus 21 are prepared in the store, and each of the purchased commodity accommodating and transporting apparatus 21 individually has a unique identification number applied thereto.

Figure 4:
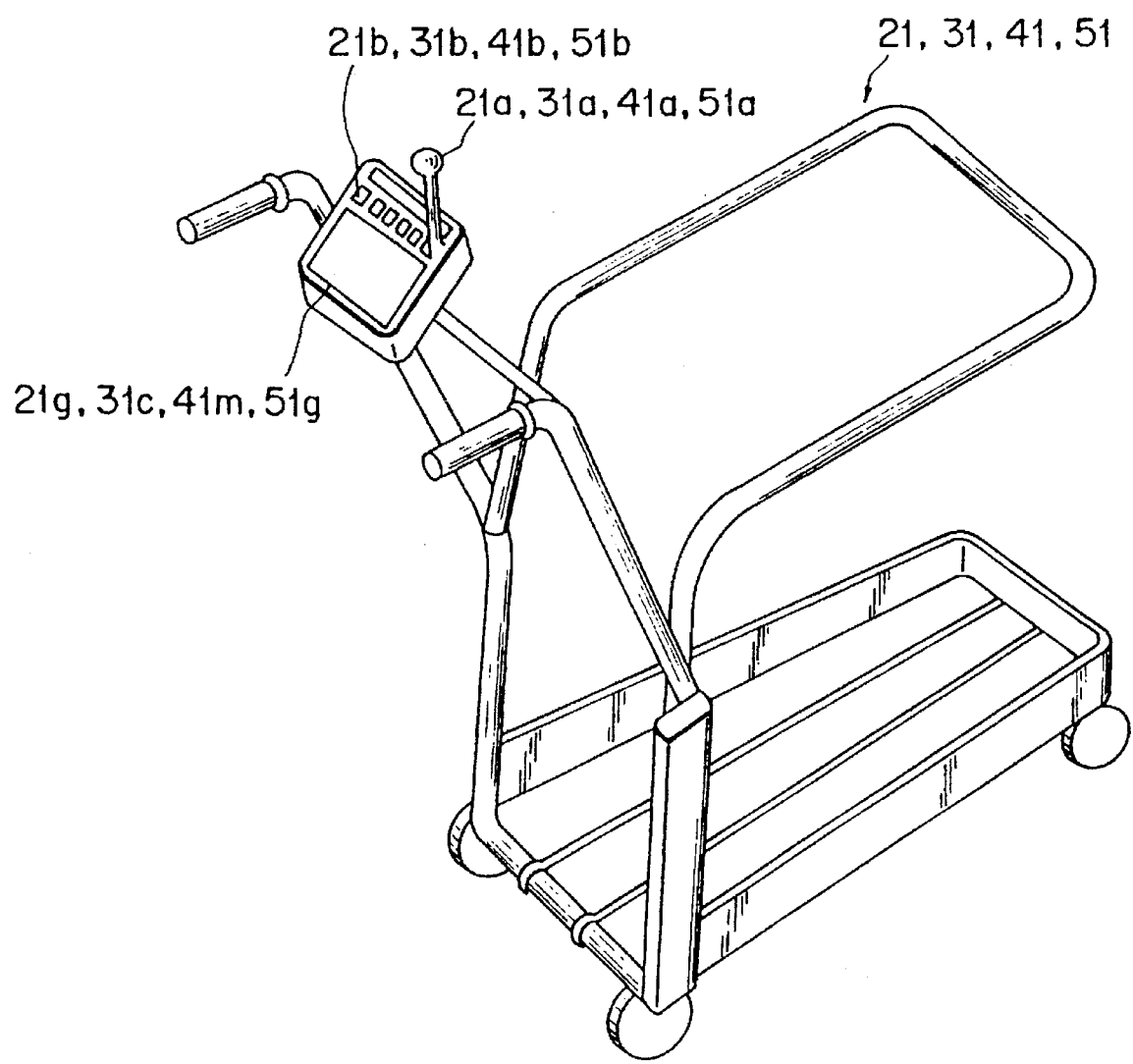
FIG. 4 is a perspective view showing a shopping cart serving as a purchased commodity accommodating and transporting apparatus to which the present invention is applied.

FIG. 4 shows a shopping cart applied as such purchased commodity accommodating and transporting apparatus 21.

Referring to FIG. 4, the shopping cart 21 includes a scanner 21a for reading a commodity code such as a bar code applied to a commodity, a keyboard 21b for being operated by a customer for a procedure of shopping, and a display section 21g capable of displaying thereon prices of commodities obtained by retrieval of a price lookup (PLU) file 23h, which will be hereinafter described, in accordance with commodity code information read by means of the scanner 21a and a total value of the prices of the purchased commodities.

Though not shown, a shopping basket (accommodation section) can be placed on the shopping cart (scanning cart, purchased commodity accommodating and transporting apparatus) 21 shown in FIG. 4 such that a customer can accommodate a commodity, whose commodity code has been read by the scanner 21a, into the shopping basket.

Referring back to FIG. 3, the shopping cart 21 further includes an input control section 21c, an inquiring processing control section 21d, a screen data reception section 21e, and a display control section 21f.

The input control section 21c receives data inputted from the scanner 21a or the keyboard 21b, and, for example, transfers the data regarding commodity code information from the scanner 21a to the inquiring processing control section 21d, but transfers, when necessary, the data from the keyboard 21b to the display control section 21f.

The inquiring processing control section 21d transmits commodity code information read by the scanner 21a as an inquiring telegram to a communication control section 23a of the controller 23, which will be hereinafter described. The screen data reception section 21e receives screen data information from the communication control section 23a. The display control section 21f receives screen data information from the screen data reception section 21e or data from the input control section 21c and controls the display by the display section 21g.

Although not shown, an identification information reading section such as a card reader is provided on the shopping cart 21 so as to input customer identification information for identification of a customer using a member's card possessed by the customer. Such customer identification information is relayed by the controller 23 and inputted to a store level processor (SLP) as an upper apparatus of the controller controller 23 so that it may be checked by the store level processor.

The controller (control apparatus) 23 controls the shopping cart 21 and the settlement POS terminal 22 and includes a communication control section 23a, a price lookup (PLU) file search section 23b, a calculation processing section 23c, a screen data edition section 23d, a detailed log file control section 23e, a detailed log file transmission section 23f, a display control section 23g, a price lookup (PLU) file 23h, a detailed log file 23i, and a display section 23j.

The communication control section 23a receives an inquiring telegram from the inquiring processing control section 21d and transmits screen data to the screen data reception section 21e. Thus, the communication control section 23a has a function as a screen data transmission section.

The price lookup file search section (commodity price retrieval section) 23b refers to the price lookup file (commodity price file) 23h to retrieve the price of a commodity corresponding to commodity code information as an inquiring telegram from the inquiring processing control section 21d. The calculation processing section (total amount calculation section) 23c calculates a total value of prices of commodities retrieved by the price lookup file search section 23b. The screen data edition section 23d edits a screen for displaying on the display section 21g of the shopping cart 21 prices of commodities retrieved by the price lookup file search section 23b and a total value of the prices of the commodities calculated by the calculation processing section 23c.

Accordingly, screen data edited by the screen data edition section 23d are transmitted to the screen data reception section 21e of the shopping cart 21 by way of the communication control section 23a and are displayed on the display section 21g of the shopping cart 21, for example, in such a manner as shown in FIG. 5.

The detailed log file control section 23e stores data regarding the names and the prices of commodities from the screen data edition section 23d and a total amount of money for the commodities as purchased commodity data including screen data into the detailed log file 23i. Upon settlement of accounts, the purchased commodity data stored in the detailed log file 23i are transmitted to the settlement POS terminal 22, which will be hereinafter described, by way of the detailed log file transmission section (data transmission section) 23f. Consequently, at the settlement POS terminal 22, a receipt is printed in accordance with the screen data received from the screen data edition section 23 d.

The settlement POS terminal 22 is provided to effect final settlement of accounts for purchased commodities accommodated in the shopping basket placed on the shopping cart 21, and includes a transmission data requesting section 22a, a detailed log file reception control section 22b, a transactions conclusion control section 22c, a display control section 22d, a printing control section 22e, a transactions data transmission control section 22f, a display section 22g, and a printing section 22h.

The transmission data requesting section 22a requests the controller 23 for purchased commodity data, for example, in response to an operation of an operator. The detailed log file reception control section 22b receives purchased commodity data transmitted thereto from the detailed log file transmission section 23f.

The transactions conclusion control section 22c performs, for example, after a procedure for final settlement of accounts based on purchased commodity data from the detailed log file transmission section 23f is completed by a customer and an operator, processing for conclusion of the transactions by an operation of the operator.

The display control section 22d effects, after the transactions are completed by the transactions conclusion control section 22c, control to display the purchased commodity data and a result of the procedure for final settlement of accounts as a result of the transactions on the display section 22g. The printing control section 22e effects control to print a receipt as such result of the transactions by means of the printing section 22h.

The controller 23 receives such transactions result information from the settlement POS terminal 22 and displays it on the display section 23j under the control of the display control section 23g.

The transactions data transmission control section 22f transmits the transactions result information as transactions data or a sales log to the store controller (STC) 24. The store controller 24 receives the information at a transactions data reception control section 24a and stores it into a transactions file 24b.

Operation of the POS system of the first embodiment of the present invention having the construction described above will be described with reference to FIGS. 6 to 8.

In particular, when a customer tries to start shopping, customer identification information of it will be inputted to the shopping cart 21 to be used using a member's card possessed by the customer. Consequently, as seen from the steps (a) and (b) in FIG. 6, the shopping cart 21 transmits the customer identification information to the store level processor by way of the controller 23 in order to check whether or not the customer identification information recorded in the member's card is qualified.

Upon reception of the customer identification information, the store level processor checks whether or not the customer identification information is qualified. When the customer identification information is qualified, the store level processor transmits, as a result of checking, to the controller 23, a signal to permit the customer to use the shopping cart 21 as a shopping cart (scanning cart) having a self scanning function. However, when the customer identification information is not qualified, the store level processor transmits, as a result of checking, to the controller 23, another signal to reject the customer to use the shopping cart 21 as a shopping cart (scanning cart) having a self scanning function, as seen from the step (c) of FIG. 6.

Figure 6:
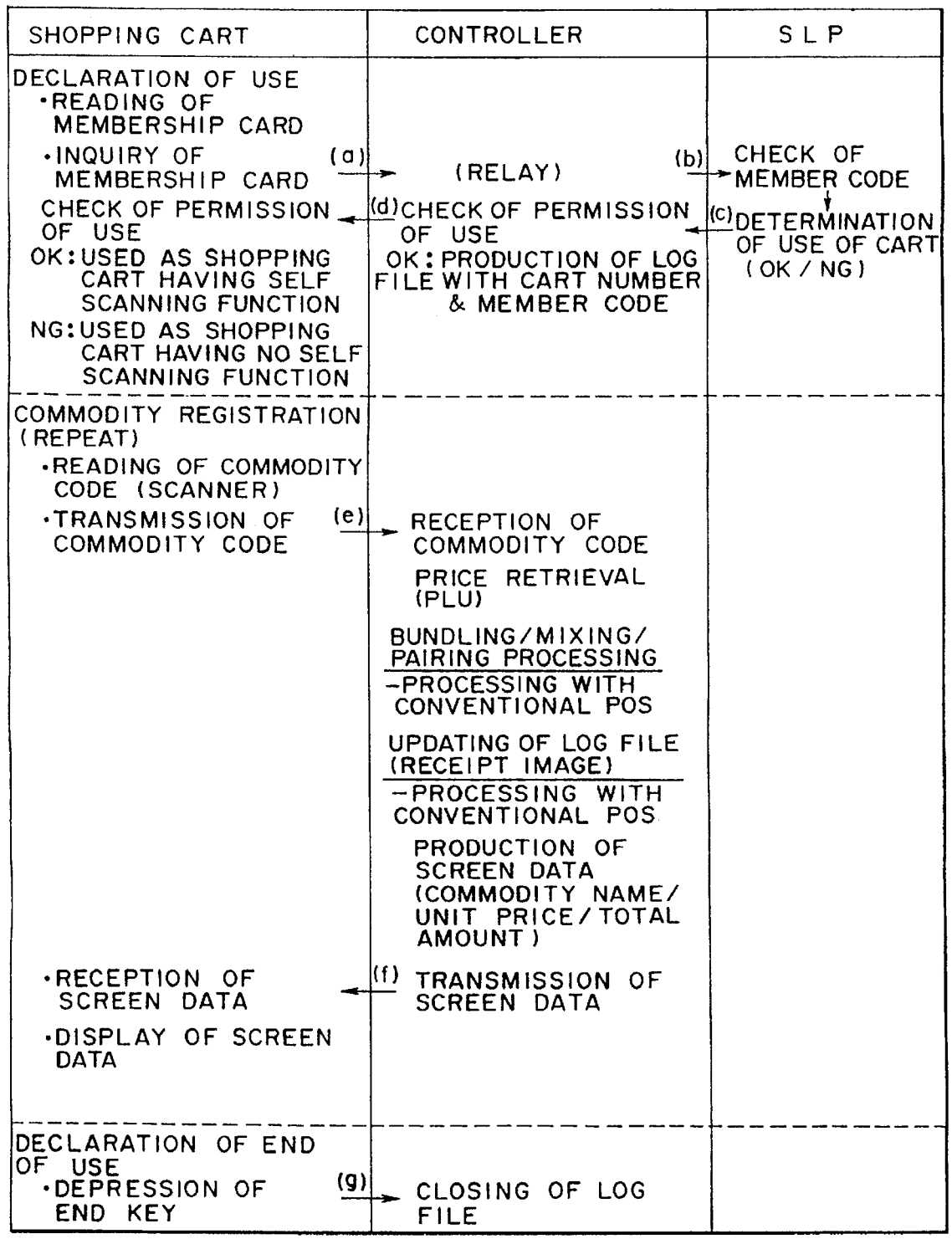
FIG. 6 is a sequence diagram of signals illustrating operation of the POS system shown in FIG. 3.

Then, the controller 23 to which the signal regarding the result of checking has been inputted produces, if the signal regarding the result of checking represents use of the shopping cart as a shopping cart having a self scanning function, a detailed log file as purchased commodity data using the identification number of the shopping cart 21 to be used by the customer and the customer identification information, and transmits the signal regarding the result of checking to the shopping cart 21 as seen from the step (d) illustrated in FIG. 6.

After the signal regarding the result of checking is received, the shopping cart 21 functions as a scanning cart if the signal regarding the result of checking represents permission of use of the shopping cart 21 as a scanning cart having a self scanning function, but on the contrary if the signal represents rejection of such use, the shopping cart 21 functions as a shopping cart having no self scanning function.

When the shopping cart 21 functions as a scanning cart, each time a commodity is accommodated by an operation of the customer, the commodity code such as a bar cord applied to the commodity is read by the scanner 21a, and the commodity code information is transmitted to the controller 23 as seen from the step (e) in FIG 6.

Upon reception of the commodity code information from the shopping cart 21, the controller 23 retrieves the price of the commodity from the price lookup file 23h and effects bundling/mixing/pairing processing. Then, the controller 23 updates data stored in the form of a receipt image in the detailed log file 23i and produces and edits screen data by means of the screen data edition section 23d.

Thereafter, as seen from the step (f) in FIG. 6, the screen data are transmitted to the shopping cart 21 by way of the communication control section 23a. Upon reception of the screen data, the screen data are displayed on the display section 21g of the shopping cart 21.

Figure 8:
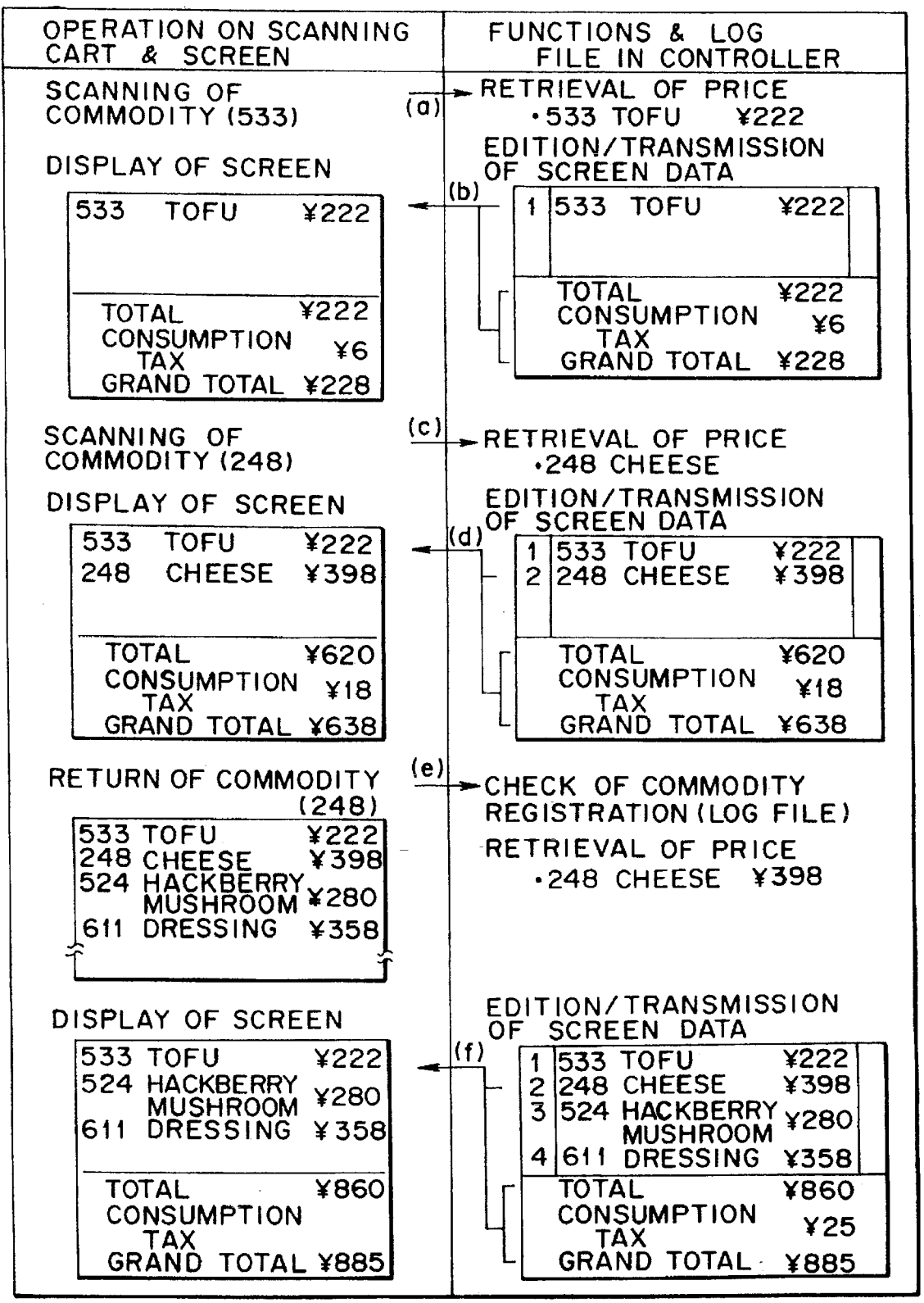
FIG. 8 is a sequence diagram of data illustrating screen display data transmitted from a controller and a process of forming a display screen of the shopping cart shown in FIG. 3.

In the commodity registration processing beginning with the scanning operation of a commodity by the scanner 21a and ending with the displaying operation by the display section 21g described above, particularly such signal processing as illustrated in FIG. 8 is performed in the controller 23.

In particular, if the customer reads the commodity code "533" of a cake of bean curd (tofu) by means of the scanner 21a, then the commodity code information "533" is transmitted to the controller 23 as seen from the step (a) in FIG. 8.

Consequently, the price lookup file search section 23b of the controller 23 retrieves the price corresponding to the commodity code "533" from the price lookup file 23h.

After the price corresponding to the commodity code "533" is retrieved, the screen data edition section 23d edits screen data, and the screen data are transmitted from the communication control section 23a to the shopping cart 21 as seen from the step (b) in FIG. 8.

Consequently, the price of the cake of bean curd (tofu), a total amount of money, the consumption tax and a grand total of amounts of money are displayed on the display section 21g of the shopping cart 21.

Similarly, if the customer reads the commodity code "248" of cheese, then the commodity code information is transmitted to the controller 23 as seen from the step (c) in FIG. 8, and screen data edited using the commodity code information is transmitted to the controller 23 as seen from (d) in FIG. 8 so that the prices of the cake of bean curd (tofu) and the cheese, a total amount of money, the consumption tax and the grand total of amounts of money are displayed on the display section 21g of the shopping cart 21.

By the way, if the customer tries to return the cheese by operation of the keyboard 21b when retrieved prices of the cake of bean curd (tofu), the cheese, hackberry mushroom and dressing are displayed on the display section 21g, the commodity code information "248" of the cheese is transmitted from the shopping cart 21 to the controller 23 together with a returning control signal as seen from the step (e) in FIG. 8.

Consequently, the controller 23 retrieves the commodity price from the price lookup file 23h in accordance with the commodity code information "248" and re-edits, in the screen data edition section 23d thereof, the screen. Then, a result of the edition is transmitted to the shopping cart 21 as seen from the step (f) in FIG. 8.

Consequently, as a result of the returning of the cheese, the prices of the cake of bean curd (tofu), the hackberry mushroom and the dressing, a total amount of money, the consumption tax and the grand total amount of money are displayed on the display section 21g.

After the commodity registration processing is performed in such a manner as described above, when the customer determines that registration of commodities to be purchased has come to an end, its shopping is ended with an operation of the keyboard 21b. Consequently, a control signal is outputted from the shopping cart 21 to the controller 23, and the detailed log file 23i of the controller 23 is closed.

Figure 7:
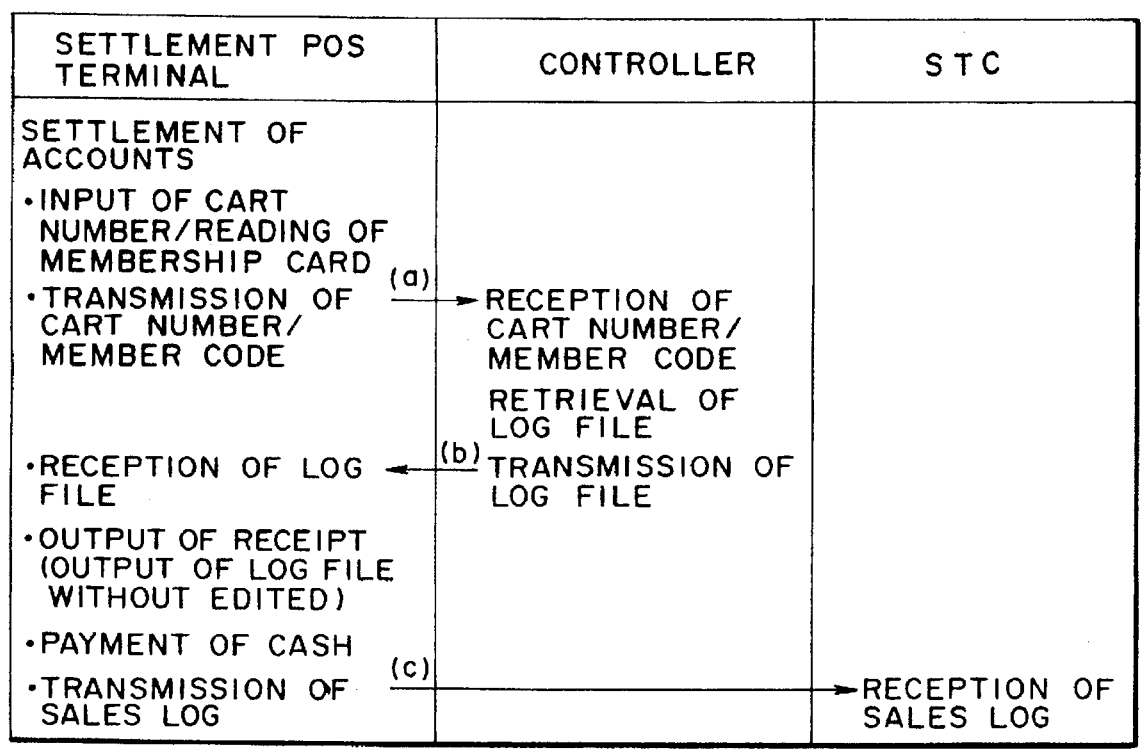
FIG. 7 is a similar view but illustrating different operation of the POS system shown in FIG. 3.

On the other hand, upon settlement of accounts for the purchased commodities, such communications of signals as illustrated in FIG. 7 are performed between the settlement POS terminal 22 and the controller 23.

In particular, at the settlement POS terminal 22, the identification number applied to the shopping cart 21 and the customer identification information of the member's card are read. The data thus read are transmitted to the controller 23 as seen from the step (a) in FIG. 7.

Then, in the controller 23, the identification number of the shopping cart 21 and the customer identification information are inputted, and corresponding data stored in the detailed log file 23i are retrieved.

After the detailed log file 23i is retrieved, the corresponding data are transmitted to the settlement POS terminal 22 as seen at the step (b) in FIG. 7. Consequently, at the settlement POS terminal 22, the data stored in the detailed log file 23i are printed as they are as a receipt, and cash is paid.

Thereafter, the thus printed data are transmitted as a sales log (transactions data) from the settlement POS terminal 22 to the store controller 24 as seen from the step (c) in FIG. 7. In the store controller 24, the sales log (transactions data) is stored into the transactions file 24b.

In this manner, with the POS system according to the first embodiment of the present invention, when settlement of accounts of the customer for the shopping cart 21 is performed, since data are transmitted in the form of a receipt image from the controller 23, commodity registration/price lookup is not performed at the settlement POS terminal 22. Consequently, the POS system is advantageous in that the time required for processing at the settlement POS terminal 22 upon settlement of accounts of a customer can be reduced remarkably.

Further, since the total amount of money for purchased commodities is displayed on the display section 21g of the shopping cart 21 even during shopping of the customer, purchase of an amount of money greater than an estimate of the customer can be prevented and the customer can prepare an estimated amount of money in advance. Accordingly, the POS system is advantageous also in that the time required for settlement of accounts can be further reduced.

It is to be noted that, while the settlement POS terminal 22 in the present embodiment receives, upon settlement of accounts, settlement information inputted from the controller 23, the settlement POS terminal 22 may otherwise have means for receiving and inputting such settlement information from the shopping cart 21.

Further, while, in the present embodiment, a detailed log as purchased commodity data is stored in the controller 23 and the settlement POS terminal 22 receives, upon settlement of accounts, the detailed log from the controller 23, alternatively each shopping cart 21 may additionally include means for storing a detailed log and means for transmitting such detailed log to the settlement POS terminal 22.

Furthermore, while commodity code information is read by the scanner 21a, alternatively a commodity code may be inputted directly, for example, by way of the keyboard 21b.

c. Second Embodiment

Figure 9:
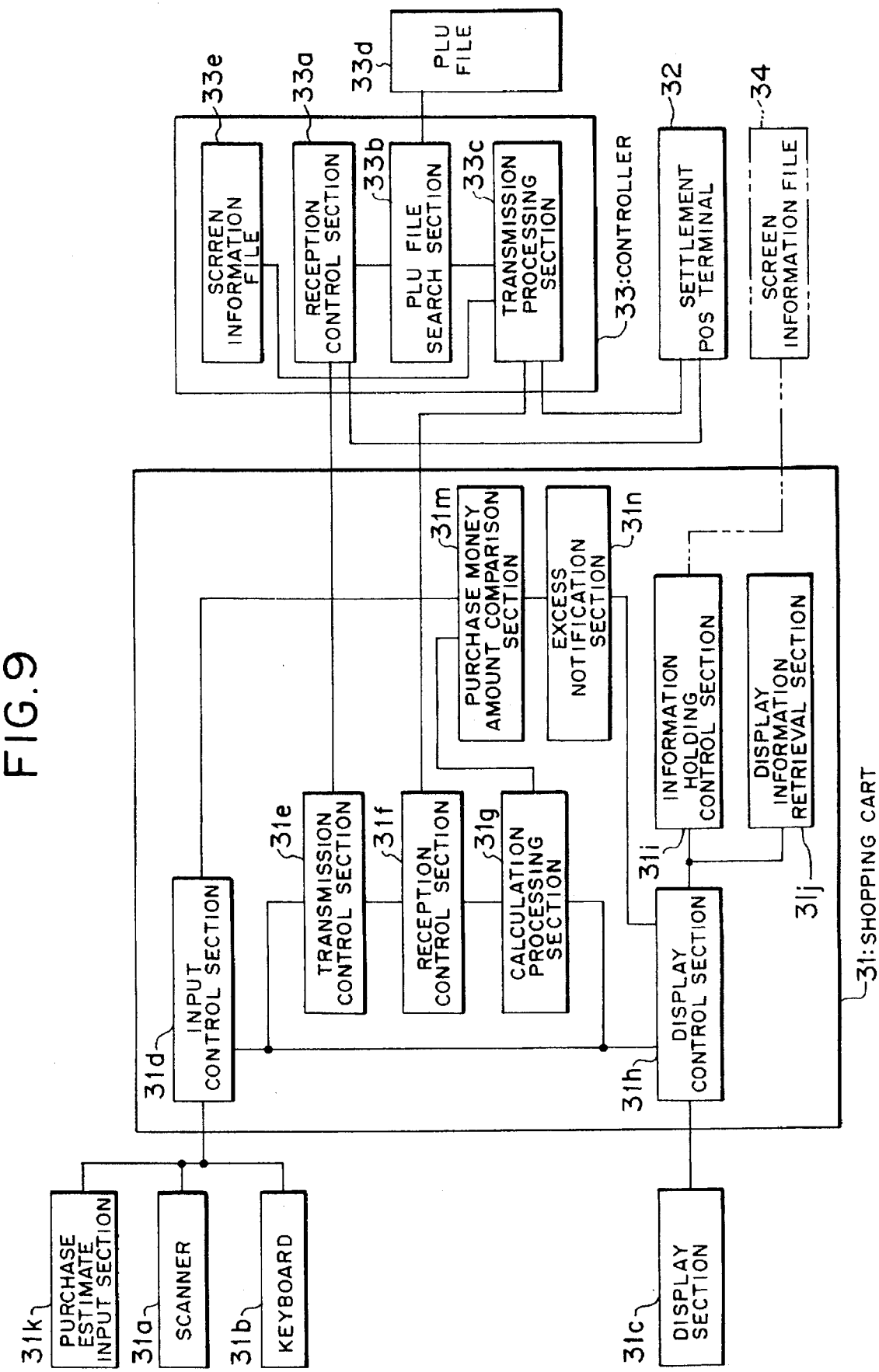
FIG. 9 is a block diagram of another POS system showing a second preferred embodiment of the present invention.

Referring now to FIG. 9, there is shown a POS system according a second preferred embodiment of the present invention. The POS system shown includes a purchased commodity accommodating and transporting apparatus 31, a settlement POS terminal 32 and a controller 33.

The purchased commodity accommodating and transporting apparatus 31 corresponds to the purchased commodity accommodating and transporting apparatus 21 in the first embodiment described above and may be a shopping cart (hand cart), a shopping basket or a like member having a self scanning function. A plurality of such purchased commodity accommodating and transporting apparatus 31 are prepared in a store so as to allow customers to accommodate and transport purchased commodities in the store, and have different unique identification numbers applied thereto. While such a shopping cart 31 as shown in FIG. 4 can be employed for the purchased commodity accommodating and transporting apparatus 31 similarly as in the first embodiment, the form of a display of the display section is different from that in the first embodiment.

Referring to FIG. 4, the shopping cart 31 shown includes a scanner 31a for reading a commodity code such as a bar code applied to a commodity similarly to the scanner 21a in the first embodiment described above.

The shopping cart 31 further includes a keyboard 31b constructed for operation by a customer for a procedure of shopping similarly as in the first embodiment described above. The keyboard 31b includes ten keys 38 of the touch sensor type provided on a display section 31c which will be hereinafter described.

It is to be noted that the scanner 31a has a function similar to that of the scanner 21a in the first embodiment described above, and accordingly, overlapping description thereof is omitted herein to avoid redundancy.

The shopping cart 31 further includes an input control section 31d which outputs, similarly as in the first embodiment, commodity code information from the scanner 31a or key input information from the keyboard 31b to a display control section 31h or a transmission control section 31e, which will be hereinafter described. Further, when a customer starts shopping using the shopping cart 31, the input control section 31d outputs a purchase estimate from a purchase estimate input section 31k, which will be hereinafter described, to a purchase money amount comparison section 31m.

The shopping cart 31 further includes a transmission control section 31e which transmits, from the shopping cart 31 to a reception control section 33a of the controller 33, commodity code information from the scanner 31a or key input information of the customer from the keyboard 31b or some other necessary information.

The shopping cart 31 further includes a reception control section 31f which receives commodity information or particular screen information from a price lookup file search section 33b of the controller 33 which will be hereinafter described.

The shopping cart 31 further includes a calculation processing section 31g which has a function similar to that of the calculation processing section 23c of the controller 23 in the first embodiment described above and calculates a total value of the prices of commodities retrieved by the price lookup file search section 33b.

The display section 31c is capable of displaying similarly as in the first embodiment, the names and the prices of commodities retrieved in accordance with commodity code information read by the scanner 21a, a total amount of money, the consumption tax and the sum total of the prices of the purchased commodities under the control of the display control section 31h. The display section 31c is further capable of displaying information of at least one of a plurality of particular screens held in the information holding control section 31i by window display.

The shopping cart 31 further includes a display control section 31h which receives, similarly as in the first embodiment, key input information from the input control section 31d and information regarding the prices of purchased commodities from the calculation processing section 31g and can display the prices of the commodities and a sum total of the prices on the display section 31c. Further, the display control section 31h receives particular screen information from a display information retrieval section 31j and can display, on the display section 31c, information of a plurality of particular screens held in the information holding control section 31i by window display, for example, as in a screen area 35 of the display section 31c shown in FIG. 10.

The shopping cart 31 further includes an information holding control section (screen information holding section) 31i in which information of a plurality of particular screens is held. In particular, the information holding control section 31i holds, in addition to information of such a particular screen regarding a bargain sale of the store as displayed on the screen area 35 in FIG. 10 by window display, information of another particular screen regarding an event of the store, information of a further particular screen regarding information of the district and so forth.

A screen area 36 of the display screen 31c shown in FIG. 10 other than the screen area 35 in which information is displayed by window display displays the prices of commodities, a total amount of money, the consumption tax, and the grand total amount of money in a similar form as in the first embodiment.

It is to be noted that the information of the plurality of particular screens held in the information holding control section 31i is inputted from a screen information file 33e of the controller 33, which will be hereinafter described, at the stage of initialization.

Figures 11, 12:
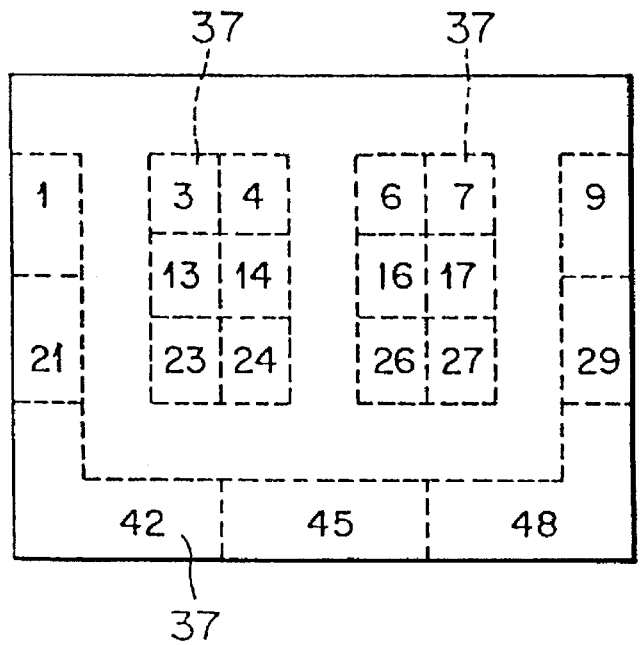
FIG. 11 is a diagrammatic view illustrating allocation of category codes of showcases in a store in which the POS system shown in FIG. 9 is employed.
FIG. 12 is a table showing category codes of commodities related to category codes of commodities from which commodity code information has been read in the POS system shown in FIG. 9.

Further, showcases 37 in the store are divided into 19 category blocks of commodities as shown in FIG. 11 in accordance with the types of commodities arranged in the store, and a category code is applied to each of the category blocks of commodities and information of a plurality of particular screens related to the category codes is held as groups (particular screen information groups).

As a group of information of a plurality of particular screens related to each category code, information of a particular screen such as bargain sale information of category blocks of commodities on adjacent showcases in the divided category blocks of commodities is held as a particular screen information group as seen in FIG. 12.

The display information retrieval section 31j retrieves a particular screen information group related to commodity code information read by the scanner 31a from the information holding control section 31i.

In particular, when a customer scans, for example, a commodity of the category code 1 by means of the scanner 31a, the display information retrieval section 31j scans the category codes 3, 13, 21 and 23 relating to the particular screen information group corresponding to commodities of the commodity code 1 from the information holding control section 31i as seen in FIG. 12.

Consequently, particular screen information such as bargain sale information of the category codes 3, 13, 21 and 23 is successively displayed by window display on the display section 31c under the control of the display control section 31h.

It is to be noted that, in the case described above, the group of category codes relating to the category code of a commodity read by the scanner 31a is constituted from category codes of category blocks of commodities on showcases adjacent the category block of commodities of the commodity code.

By the way, particular screen information regarding event information of the store or information of the district is displayed by window display at a suitable point of time on the display section 31c by operation of the display control section 31h irrespective of a commodity code reading operation of a customer by operation of the scanner 31a.

Figure 13:
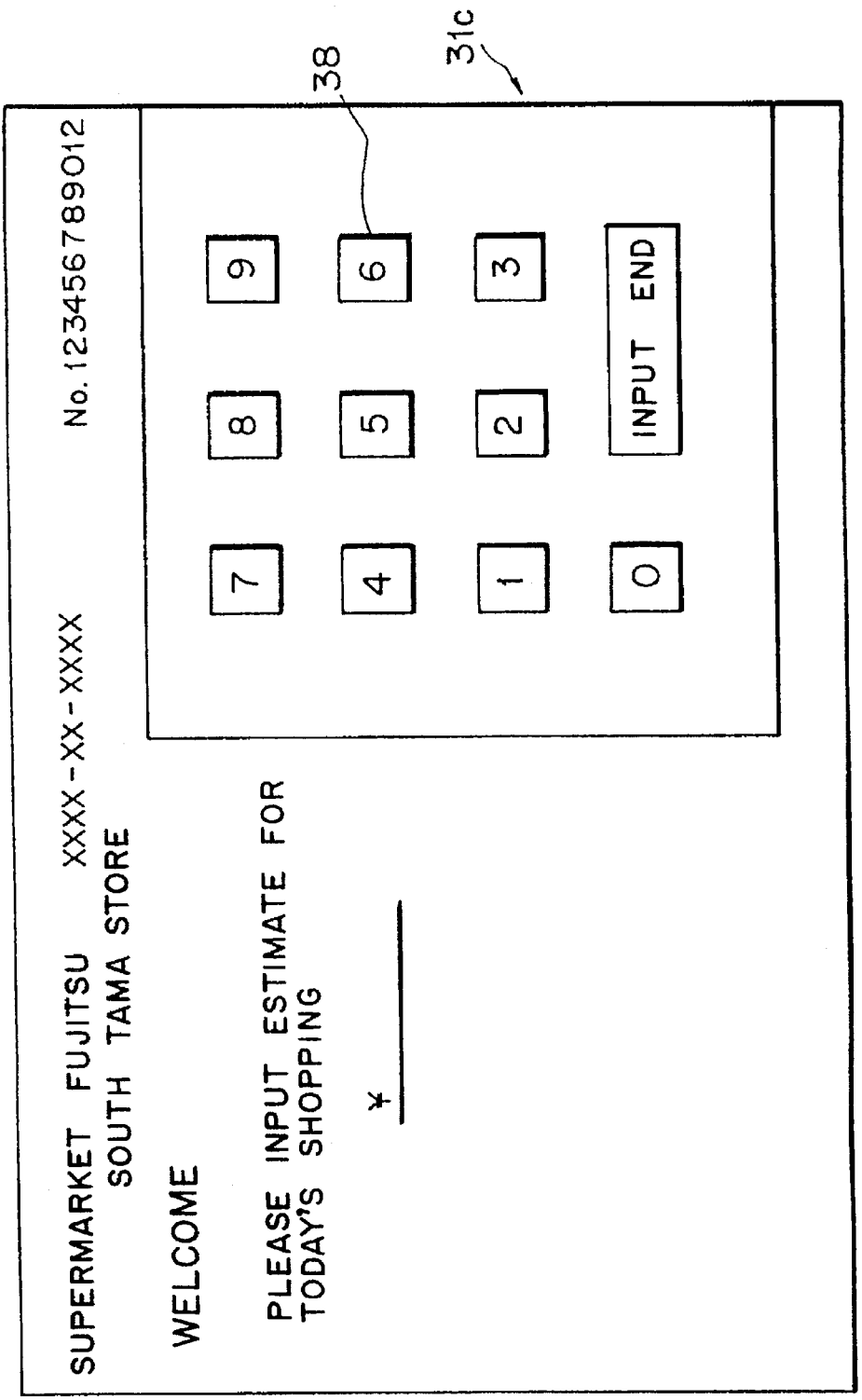
FIG. 13 is an illustration showing an input screen for a purchase estimate displayed when a customer starts shopping with the POS system shown in FIG. 9.

The purchase estimate input section (inputting section) 31k is constituted, for example, from ten keys of the touch sensor type on the display section 31c as shown in FIG. 13 and is used to input a purchase estimate when a customer starts its shopping using the shopping cart 31.

The purchase money amount comparison section 31m compares, in response to an operation of a customer, a purchase estimate inputted from the purchase estimate input section 31k and a total amount of money for commodities calculated by the calculation processing section 31g.

The shopping cart 31 further includes an excess notification section 31n which controls, when it is determined by the purchase money amount comparison section 31m that the total amount of money exceeds the purchase estimate, the display control section 31h so that the determination is displayed on the display section 31c. Consequently, the fact that the purchase estimate has been exceeded is notified to the customer.

The controller (control apparatus) 33 controls the shopping cart 31 and the settlement POS terminal 32 and includes the reception control section 33a, the price lookup file search section 33b, a transmission processing section 33c, a price lookup file 33d, and the screen information file 33e.

The reception control section 33a receives such a signal as described hereinabove from the transmission control section 31e of the shopping cart 31 or the settlement POS terminal 32. The transmission processing section 33c transmits such a signal as described above to the reception control section 31f of the shopping cart 31 or the settlement POS terminal 32.

The screen information file 33e stores such particular screen information of bargain sale information, information of an event of the store or information of the district to be displayed by window display on the display section 31c as described hereinabove.

The price lookup file search section 33b receives, as in the first embodiment described hereinabove, commodity code information inputted thereto from the shopping cart 31, and refers to the price lookup file 33d to retrieve commodity information such as the name and the price of the commodity and so forth corresponding to the commodity code information.

Operation of the POS system of the second embodiment of the present invention having the construction described above will be described with reference to a signal sequence diagram shown in FIG. 14.

Figure 14:
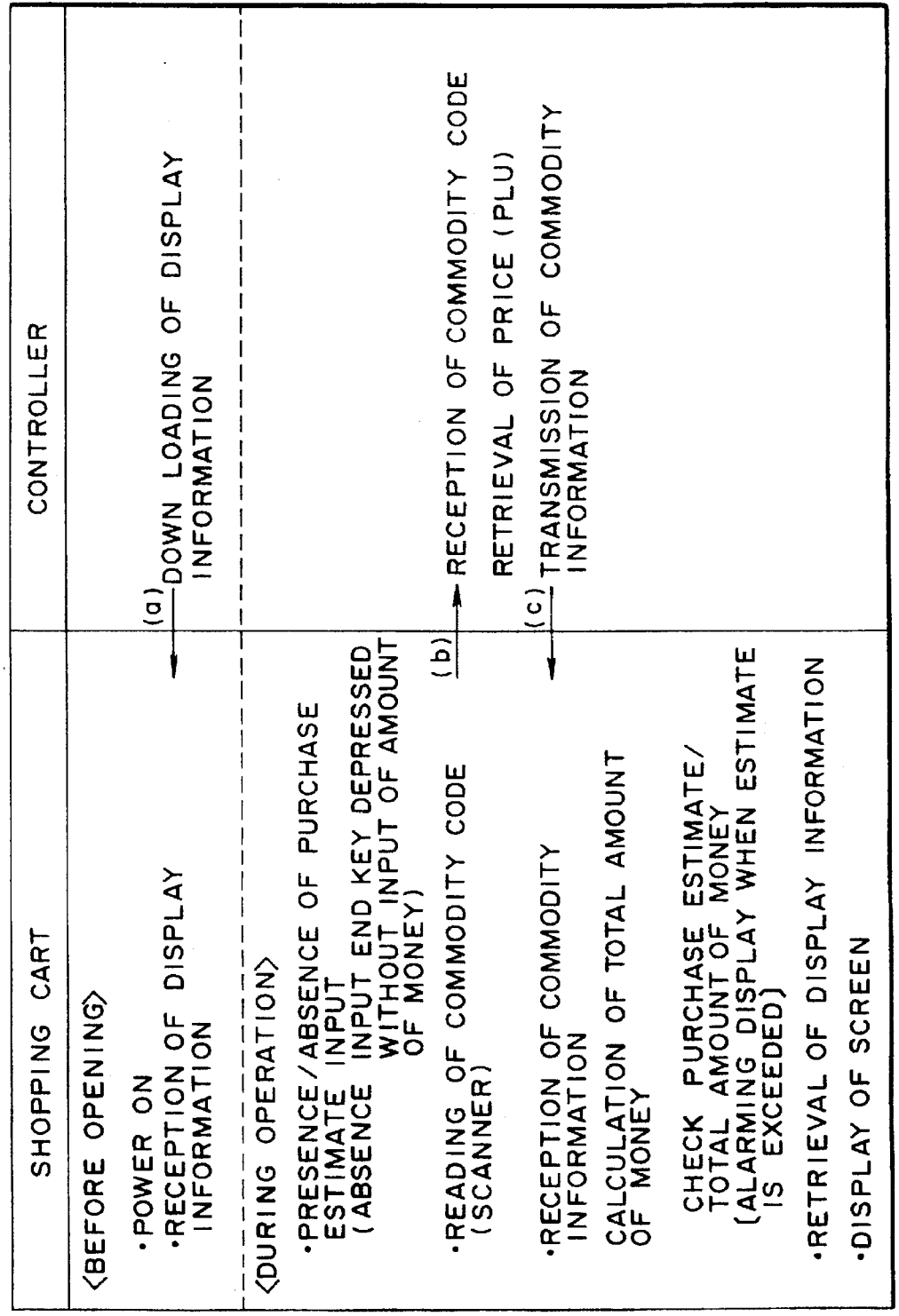
FIG. 14 is a sequence diagram of signals illustrating operation of the POS system shown in FIG. 9.

In particular, before the store is opened, the power supply is made available as initialization of the shopping cart 31, and the particular screen information is loaded down from the screen information file 33e of the controller 33 and held by the information holding control section 31i as seen from the step (a) in FIG. 14.

Then, when a customer starts shopping using the shopping cart 31, such a screen as shown in FIG. 13 is displayed on the display section 31c of the shopping cart 31. Further, when necessary, the ten keys 31k displayed on the display section 31c will be selectively depressed to input a purchase estimate. When not necessary, as input end key will be depressed instead of inputting an amount of money.

Then, each time a commodity to be purchased is scanned by the customer by means of the scanner 31a, the commodity code applied to the commodity is read, and the commodity code information is transmitted to the reception control section 33a of the controller 33 by way of the transmission control section 31e as seen from the step (b) in FIG. 14.

In the controller 33, the price lookup file search section 33b refers to the price lookup file 33d in accordance with the commodity code information received by the reception control section 33a to retrieve the price of the commodity corresponding to the commodity code information including the name of the commodity. Then, the name and the price of the commodity corresponding to the commodity code information are transmitted as commodity information to the reception control section 31f of the shopping cart 31 by way of the transmission processing section 33c as seen from the step (c) in FIG. 14.

When the commodity information from the controller 33 is received by the reception control section 31f, the calculation processing section 31g calculates the total amount of money for the commodities for which a scanning operation has been performed by the customer using the scanner 31a and displays the names and the prices of the commodities, the total amount of money, the consumption tax and the grand total amount of money on the display section 31c.

Then, if the customer inputted a purchase estimate upon starting of shopping, the purchase money amount comparison section 31m compares the purchase estimate and the total amount of money for the commodities calculated by the calculation processing section 31g with each other, and when it determines that the total amount of money for the commodities is greater than the purchase estimate, the excess notification section 31n controls the display section 31c so as to display (alarm) that the total amount of money is in excess of the purchase estimate.

It is to be noted that, when such commodity information is received as seen from the step (c) in FIG. 14, the display information retrieval section 31j of the shopping cart 31 retrieves a particular screen information group relating to the commodity information held in the information holding control section 31i, and information of particular screens in the group is successively displayed by window display on the display section 31c.

By the way, particular screen information regarding information of an event of the store or information of the district can be displayed by window display on the display section 31c by operation of the display control section 31h during operation of the shopping cart 31 irrespective of a commodity code reading operation of the customer by operation of the scanner 31a.

In this manner, with the POS system of the second embodiment of the present invention, since the total amount of money for purchased commodities is displayed on the display section 21g of the shopping cart 21 even during shopping of the customer, shopping of an amount of money greater than an estimate of the customer can be prevented and the amount of money for settlement can be prepared in advance. Consequently, the POS system is advantageous in that the time required for settlement of accounts can be further reduced.

Further, since particular screen information regarding information of an even of the store or information of the district other than shopping information is displayed by window display on the display section 21g of the shopping cart 21, the POS system is advantageous also in that better services can be provided to the customer.

Further, if a purchase estimate is inputted upon starting of shopping by a customer and is then exceeded during shopping, then this can be notified to the customer by way of the display section 21g of the shopping cart 21, and consequently, the POS system is further advantageous in that shopping of an amount of money greater than the estimate of the customer can be prevented.

It is to be noted that, although the particular screen information to be stored into the information holding control section 31i is read in from the screen information file 33e of the controller 33 at the stage of initialization, it may otherwise be read in from another screen information file 34 which is mounted on the shopping cart 31.

Further, while commodity code information is read by means of the scanner 31a, alternatively a commodity code may be inputted directly, for example, by way of the keyboard 31b.

d. Third Embodiment

Referring now to FIG. 15, there is shown a POS system according to a third preferred embodiment of the present invention. Also the POS system shown includes at least one purchased commodity accommodating and transporting apparatus 41, at least one settlement POS terminal 42, and a controller 43. The POS system of the present embodiment is different from the POS systems of the first and second embodiments described above in the forms of a display and a print on the settlement POS terminal 42, that purchased commodity data are received from a shopping cart or purchased commodity accommodating and transporting apparatus 41 upon settlement of accounts at the settlement POS terminal 42, and that the controller 43 includes means for issuing a point number calculated by conversion of the total amount of money for purchased commodities for a predetermined period of time.

The purchased commodity accommodating and transporting apparatus 41 corresponds to the purchased commodity accommodating and transporting apparatus 21 and 31 in the first and second embodiments described above and may be a shopping cart (hand cart), a shopping basket or a like member having a self scanning function. A plurality of such purchased commodity accommodating and transporting apparatus 41 are prepared in a store so as to allow customers to accommodate and transport purchased commodities in the store, and have different unique identification numbers applied thereto. Such a shopping cart 41 as shown in FIG. 4 can be employed for the purchased commodity accommodating and transporting apparatus 41, and a shopping basket not shown can be placed onto the shopping cart.

The shopping cart 41 includes a customer card reading section 41a for reading unique customer information of a customer such as a membership number recorded on a card possessed by the customer.

The shopping cart 41 further includes a scanner 41b and a keyboard 41c. Since they are similar to those in the first and second embodiments described above, overlapping descriptions thereof will be omitted herein to avoid redundancy.

The shopping cart 41 further includes an input control section 41d which receives data inputted from the customer card reading section 41a, the scanner 41b or keyboard 41c and, for example, outputs commodity code information such as a bar code read by way of the scanner 41b or inputted directly by way of the keyboard 41c to a price lookup file search section 41e, but stores unique customer information such as a membership number inputted from the customer card reading section 41a into a detailed log file 41n which will be hereinafter described.

The shopping cart 41 further includes the price lookup file search section 41e, a calculation processing section 41f, a detailed log file control section 41g, a price lookup file 41k, and the detailed log file 41n which have similar functions to the price lookup file search section 23b, the calculation processing section 23c, the detailed log file control section 23e, the price lookup file 23h, and the detailed log file 23i of the controller 23, respectively, in the first embodiment.

In particular, the price lookup file search section 41e refers to the price lookup file 41k to retrieve the price of a commodity corresponding to commodity code information from the input control section 41d. The calculation processing section 41f calculates, from the prices of commodities retrieved by the price lookup file search section 41e, a total amount of money, the consumption tax and a grand total amount of money. The detailed log file control section 41g stores data regarding the membership number from the customer card reading section 41a as well as the prices of the purchased commodities, the total amount of money, the consumption tax and the grand total from the calculation processing section 41f as purchased commodity data into the detailed log file 41n.

The shopping cart 41 further includes a display section 41m which receives the purchased commodity data stored in the detailed log file 41n and displays the prices of the purchased commodities, the total amount of money, the consumption tax and the grand total.

The shopping cart 41 further includes an input end control section 41h which notifies, when it is determined as a result of operation of the keyboard 41c by a customer that reading operations of the commodity codes applied to a commodities using the scanner 41a or the keyboard 41c are completed, such completion to a sorting processing section 41i.

The sorting processing section 41i sorts, at a point of time when a notification is received from the input end control section 41h and a reading operation of commodity codes is completed, the commodities, for which a reading operation of the commodity codes stored in the detailed log file 41n has been performed, into different commodity categories, to which the commodities belong, in accordance with the commodity codes of the commodities.

The shopping cart 41 further includes a detailed data transmission control section 41j which transmits purchased commodity data sorted into the commodity categories, to which the commodity belong, by the sorting processing section 41i as detailed data including unique customer information such as a membership number of the customer to the settlement POS terminal 42.

The settlement POS terminal 42 performs final settlement of accounts for purchased commodities similarly to the settlement POS terminals 22 and 32 in the first and second embodiments.

The settlement POS terminal 42 includes a detailed data reception control section 42a which receives detailed data as a result of sorting processing from the detailed data transmission control section 41j of the shopping cart 41.

The settlement POS terminal 42 further includes a price lookup file search section 42b, a calculation processing section 42c, and a price lookup file 42f, which operate similarly to the price lookup file search section 41e, the calculation processing section 41f, and the price lookup file 41k described above, respectively. In particular, the price lookup file search section 42b refers to the price lookup file 42f to retrieve the price of a commodity corresponding to commodity code information of a result of sorting processing from the detailed data reception control section 42a. The calculation processing section 42c calculates, from the prices of commodities retrieved by the price lookup file search section 42b, a total amount of money, the consumption tax and a grand total.

The settlement POS terminal 42 further includes a transactions log file control section 42d which controls so that the result of sorting processing including the total amount of money, the consumption tax and the grand total is displayed on the display section 42g, printed (issued) as a receipt by a printing section 42h, and stored into a transactions log file 42i.

A receipt issued from the printing section 42h can be utilized as it is as a receipt by a customer since purchased commodities are printed on the receipt for individual categories to which the commodities belong.

In particular, when a reading operation of commodity codes of commodities is performed by a customer, the commodities are displayed in order of the reading operations of them on the display section 41m as shown in FIG. 16. Meanwhile, the commodities are displayed on the display section 42g in a condition wherein they are sorted into categories to which the commodities belong as shown in FIG. 17, and such a receipt as shown in FIG. 18 is issued from the printing section 42h.

The settlement POS terminal 42 further includes a transaction data transmission control section 42e which transmits, after final settlement of accounts for purchased commodities is completed, a result of sorting processing stored in the transactions long file 42i as transactions data to the controller 43.

The controller 43 controls the shopping cart 41 and the settlement POS terminal 42, and includes a transactions data reception control section 43a, a point addition section 43b, a period management section 43c, a point addition edition section 43d, and a point issuance section 43e.

The transactions data reception control section 43a receives transactions data from the transactions data transmission control section 42e of the settlement POS terminal 42.

The point addition section (point number storage section) 43b converts a total amount of money (total amount of money for purchased commodities) of transaction data from the transactions data reception control section 43a into a point number and cumulatively stores the point number for each unique customer information such as a membership number.

The period management section 43c determines elapse of a fixed period of time (for example, one month). The point addition edition section 43d edits the point number stored for each customer in the point addition section 43b when it is determined by the period management section 43c that the fixed period of time has elapsed.

The point issuance section 43e issues, for example, such a print as shown in FIG. 19 in connection with a point number edited by the point addition edition section 43d to notify the point number.

Operation of the POS system of the third embodiment of the present invention having the construction described above will be described with reference to the flow charts of FIGS. 20 to 22.

Figure 20:
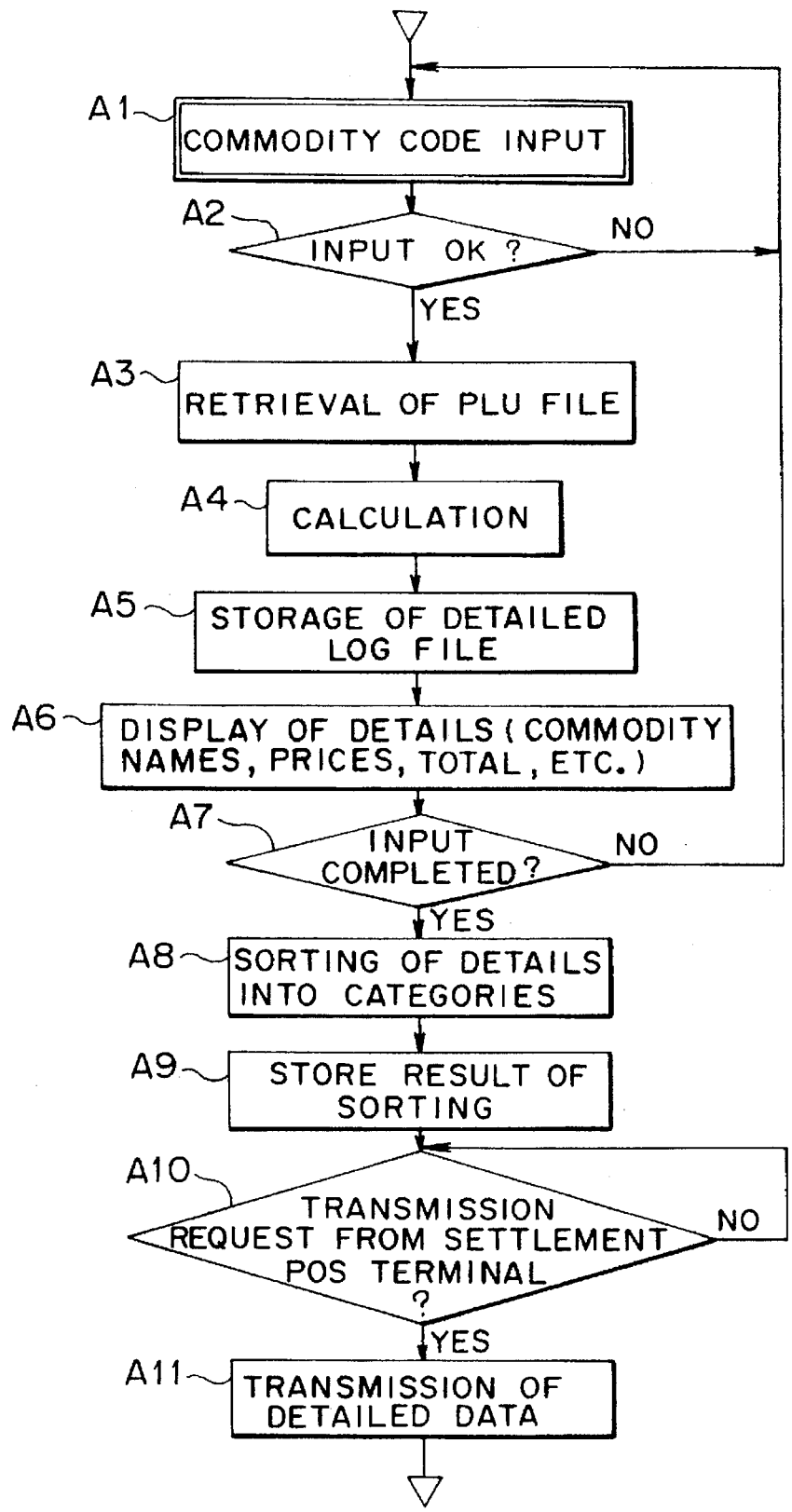
FIG. 20 is a flow chart illustrating operation of a shopping cart employed in the POS system shown in FIG. 15.

Referring first to FIG. 20, a customer will perform a reading operation of a commodity code such as bar code information by means of the scanner 41b or the keyboard 41c (step A1). Then, if a commodity code has been read correctly at step A2, then the PLU file search section 41e retrieves the price of the commodity in accordance with the commodity code (step A3). On the contrary when the commodity code has not been read correctly, another commodity code reading operation will be performed at step A1.

After the price of the commodity whose commodity code has been read is retrieved at step A3, the calculation processing section 41f calculates the total amount of money, the consumption tax, the grand total and so forth for the purchased commodities (step A4).

After the total amount of money, the consumption tax, the grand total and so forth for the purchased commodities are calculated by the calculation processing section 41f, the detailed log file control section 41g stores the total amount of money, the consumption tax, the grand total and so forth from the calculation processing section 41f as well as the names and the prices of the purchased commodities and the unique customer information as purchased commodity data into the detailed log file 41n (step A5), and the display section 41m displays the purchased commodity data stored in the detailed log file 41n (step A6).

Then, if the input end control section 41h determines that a reading operation of commodity codes by the customer using the scanner 41b or the keyboard 41c is completed (step A7), then the sorting processing section 41i performs sorting processing of the purchased commodity data at step A8. On the contrary if the reading operation of commodity codes is not completed as yet at step A7, then a reading operation of a commodity code will be performed at step A1 again.

Then, the purchased commodity data as a result of the sorting processing performed at step A8 are stored as settled purchased commodity data into the detailed log file 41n (step A9).

Thereafter, if transmission of the settled purchased commodity data described above is requested from the settlement POS terminal 42 (step A10), the settled purchased commodity data are transmitted as detailed data to the detailed data transmission control section 41j (step A11).

Figure 21:
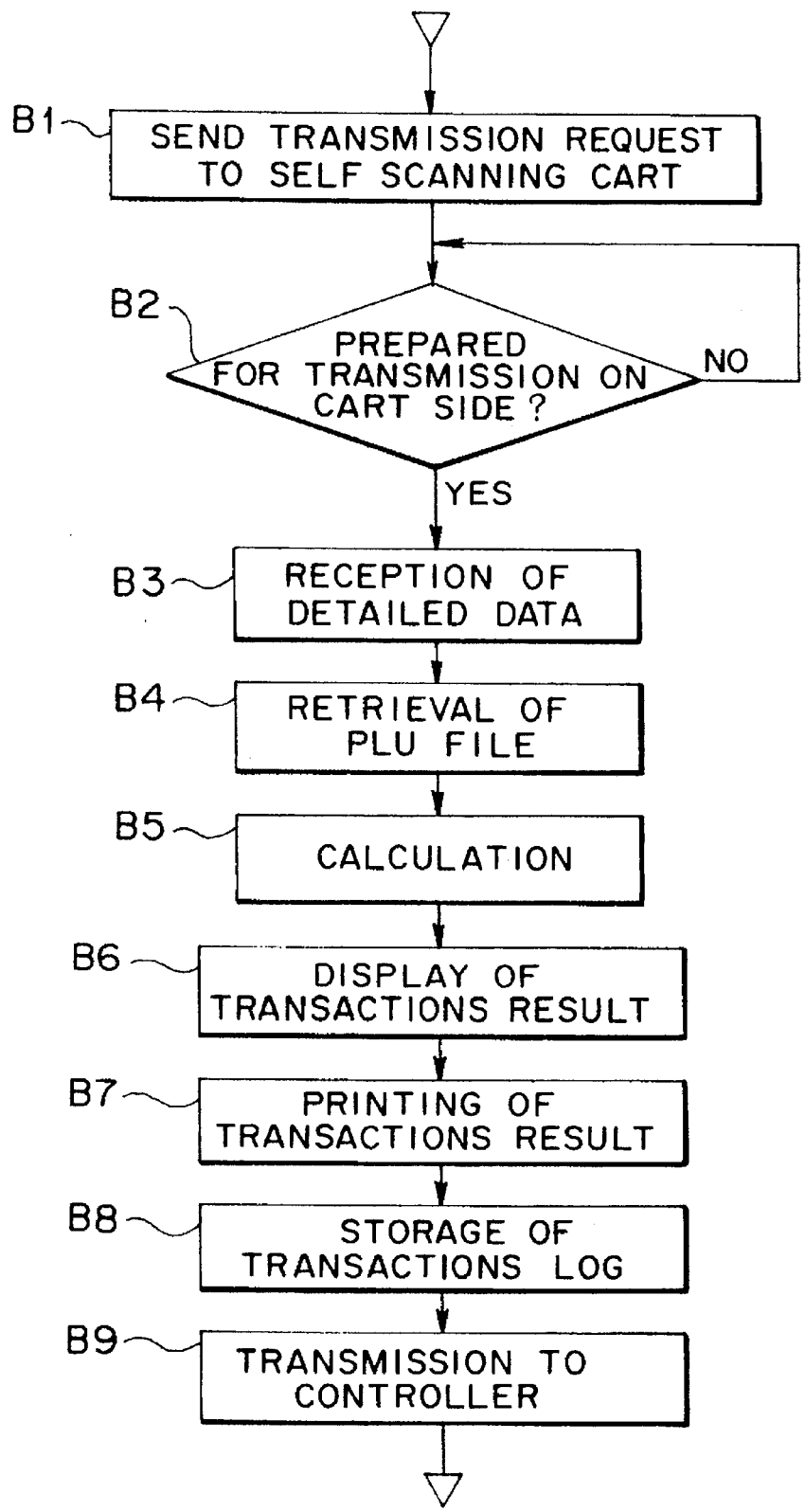
FIG. 21 is a similar view but illustrating operation of a settlement POS terminal employed in the POS system shown in FIG. 15.

Referring now to FIG. 21, on the settlement POS terminal 42 side, when final settlement of accounts is to be performed for the customer, a request for transmission of detail data is sent to the shopping cart 41 at step B1.

After the shopping cart 41 is prepared for transmission of detailed data (step B2), the detailed data from the detailed data transmission control section 41j described above are received at the detailed data reception control section 42a (step B3).

Then, the price lookup file search section 42b refers to the price lookup file 42f to retrieve the prices of commodities in accordance with the received detailed data (step B4), and the calculation processing section 42c calculates the total amount of money, the consumption tax, the grand total and so forth in accordance with the retrieved prices of the commodities (step B5).

After the total amount of money, the consumption tax, the grand total and so forth are calculated by the calculation processing section 42c, the names and the prices of the sorted commodities as well as the calculated total amount of money, consumption tax, grand total and so forth are displayed on the display section 42g (step B6), printed as a receipt by the printing section 42h (step B7), and sorted into the transactions log file 42i (step B8).

Thereafter, the information stored in the transactions log file 42i is transmitted as transactions data to the controller 43 by the transactions data transmission control section 42e (step B9). The transactions data naturally include unique customer information such as a membership number of the customer.

Figure 22:
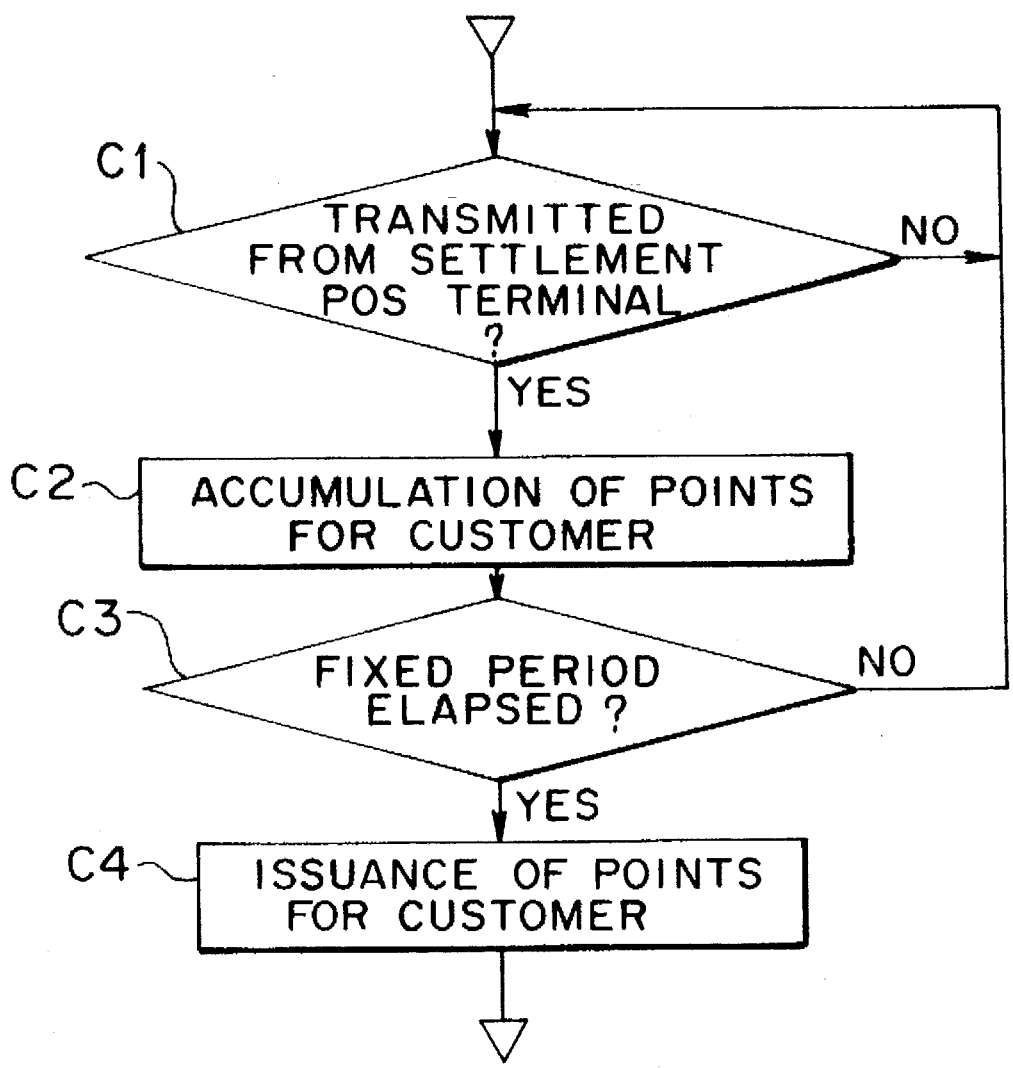
FIG. 22 is a flow chart illustrating operation of a controller of the POS system shown in FIG. 15.

Then, on the controller 43 side, processing illustrated in FIG. 22 is executed. In particular, referring to FIG. 22, the transactions data from the settlement POS terminal 42 are received by the transactions data reception control section 43a (step C1), and the point addition section 43b converts the total purchase amount of money for the membership number of the customer into a point number and cumulatively adds the point number (step C2).

Then, if it is determined by the period management section 43c that the fixed period of time has elapsed (step C3), the point addition edition section 43d edits the point number cumulatively added by the point addition section 43b, and the point issuance section 43e issues the point number for the membership number of the customer.

In this manner, with the POS system of the third embodiment of the present invention, the advantages enjoyed by the POS system of the first embodiment described above can be achieved. Further, since purchased commodities printed on a receipt by the settlement POS terminal 42 are sorted in categories to which the commodities belong, the POS system is advantageous also in that the receipt can be used as it is as a record of household accounts, which is convenient to the customer.

Furthermore, since a point number obtained by conversion of the total purchase amount of money can be issued after each fixed period of time, the POS system is further advantageous in that better services can be provided to the customer.

It is to be noted that, while the settlement POS terminal 42 in the present embodiment performs price retrieval processing which has been performed by the shopping cart, alternatively a result of price retrieval from the shopping cart 41 may be utilized as it is.

Further, the window displaying processing of particular screen information employed in the POS system of the second embodiment may be applied also in the POS system of the present embodiment.

e. Fourth Embodiment

Figure 23:
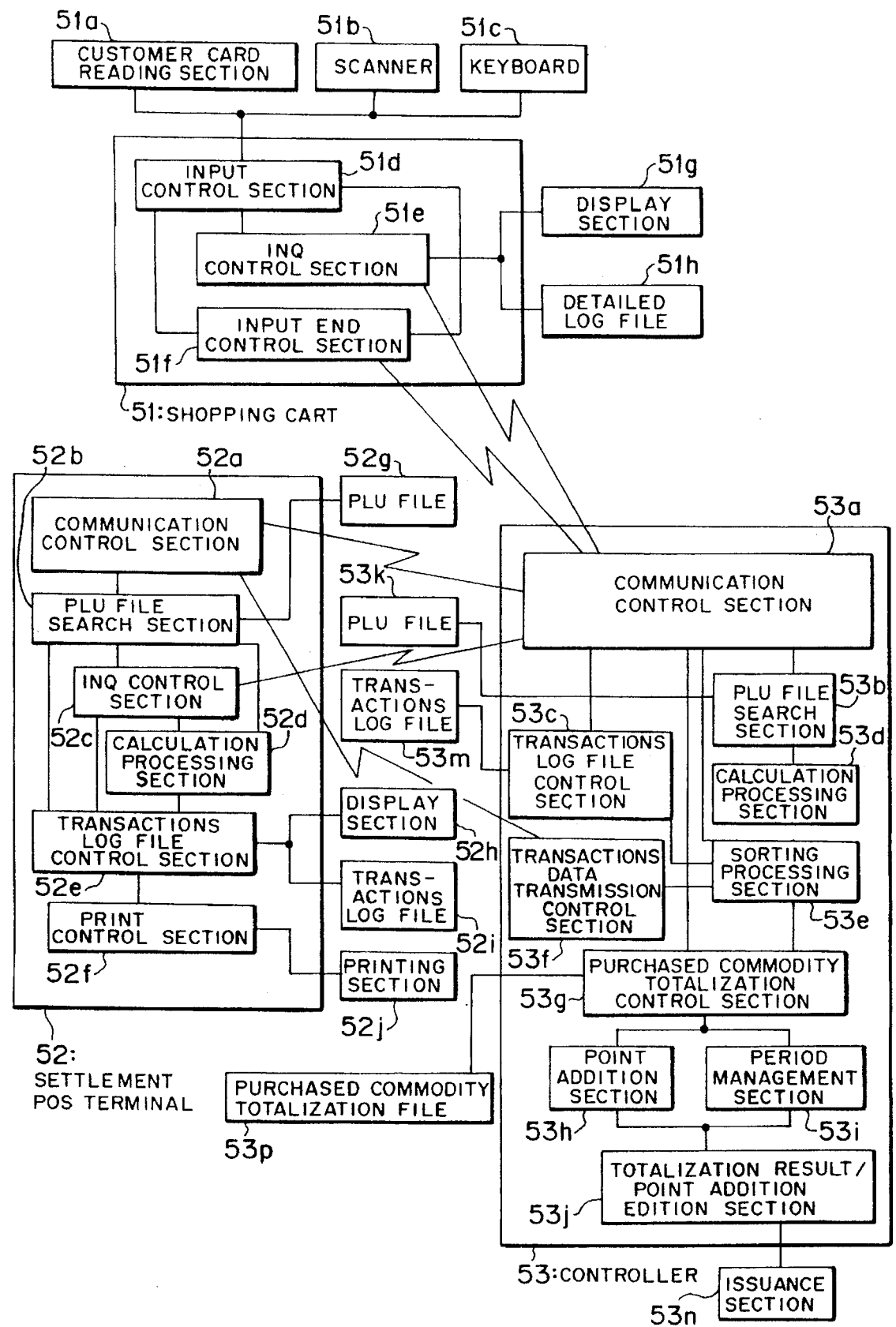
FIG. 23 is a block diagram of a still further POS system showing a fourth preferred embodiment of the present invention.

Referring now to FIG. 23, there is shown a POS system according to a fourth preferred embodiment of the present invention. Also the POS system shown includes at least one purchased commodity accommodating and transporting apparatus 51, at least one settlement POS terminal 52, and a controller 53. The POS system of the present embodiment is different from the POS system of the third embodiment described above in that the settlement POS terminal 52 receives, upon settlement of accounts, purchased commodity data from the controller 53 and that the controller 53 can issue a result of totalization of purchased commodities after each fixed period of time.

The purchased commodity accommodating and transporting apparatus 51 corresponds to the purchased commodity accommodating and transporting apparatus 21, 31 and 41 in the first to third embodiments described above, and may be a shopping cart (hand cart), a shopping basket or a like member having a self scanning function. A plurality of such purchased commodity accommodating and transporting apparatus 51 are prepared in a store so as to allow customers to accommodate and transport purchased commodities in the store, and have different unique identification numbers applied thereto. Such a shopping cart 51 as shown in FIG. 4 can be employed for the purchased commodity accommodating and transporting apparatus 51, and a shopping basket not shown can be placed onto the shopping cart.

The shopping cart 51 includes a customer card reading section 51a, a scanner 51b and a keyboard 51c which have similar functions to those of the customer card reading section 41a, the scanner 41b and the keyboard 41c, respectively, in the third embodiment.

The shopping cart 51 further includes an input control section 51d which transfers commodity code information from the customer card reading section 51a, the scanner 51b or the keyboard 51c and unique customer information such as a membership number of a customer to an inquiring (INQ) control section 51e, which will be hereinafter described, but transfers an ending signal for a commodity code reading operation from the keyboard 21b to an input end control section 51f.

The inquiring control section 51e transmits commodity code information read by the scanner 51b as an inquiring telegraph to a communication control section 53a of the controller 53, which will be hereinafter described, and receives purchased commodity data from the controller 53.

The input end control section 51f transmits, when an ending signal for a commodity code reading operation is inputted as a result of a key operation of the keyboard 51c, the ending signal to the controller 53.

A display section 51g displays purchased commodity data received by the inquiring control section 51e and, for example, has a displaying form similar to that of FIG. 16 in the third embodiment described hereinabove.

A detailed log file 51h is provided to store purchased commodity data received by the inquiring control section 51e.

Meanwhile, the controller 53 controls the shopping cart 51 and the settlement POS terminal 52.

The controller 53 includes the communication control section 53a which controls communications of an inquiring telegram and a response signal between the shopping cart 51 and the settlement POS terminal 52. The controller 53 further includes a price look file search section 53b, a transactions log file control section 53c, a calculation processing section 53d, a price lookup file (commodity price file) 53k and a transactions log file 53m which have similar functions to the price lookup file search section 23b, the detailed log file control section 23e, the calculation processing section 23c, the price lookup file 23h and the detailed log file 23i of the controller 23 in the first embodiment, respectively.

The controller 53 further includes a sorting processing section 53e which receives an ending signal for a commodity code reading operation from the input end control section 51f and sorts not only purchased commodity data stored in the transactions log file 53m but also purchased commodity totalization information stored in a purchased commodity totalization file 53p into categories to which the commodities belong.

The controller 53 further includes a transactions data transmission control section 53f which receives, upon final settlement of accounts at the settlement POS terminal 52, a request for transmission of purchased commodity data of the customer and transmits purchased commodity data as a result of sorting processing by the sorting processing section 53e to the settlement POS terminal 52.

The controller 53 further includes a purchased commodity totalization control section 53g which controls so that, for each unique customer information from the customer card reading section 51a of the shopping cart 51, purchased commodity data as a result of sorting processing regarding the customer having the unique customer information are cumulatively stored into the purchased commodity totalization file 53p for a fixed period of time which is controlled by a period management section 53i which will be described below.

The controller 53 further includes a point addition section 53h and a period management section 53i which have functions similar to the point addition section 43b and the period management section 43c, respectively, in the third embodiment described above.

The controller 53 further includes a totalization result/ point addition edition section 53j which edits, if it is determined by the period management section 53i that the fixed period of time has elapsed, purchased commodity data stored for each unique customer information in the purchased commodity totalization file 53p as a result of purchased commodity totalization and edits a point number stored for each unique customer information in the point addition section 53h.

The controller 53 further includes an issuance section 53n which issues a result of purchased commodity totalization and a point number edited by the totalization result/point addition edition section 53j in the form of, for example, such a print as shown in FIG. 24 to notify the information to the customer.

In the print shown in FIG. 24, the fixed period is set to one month and the purchased commodities are issued in an arranged condition for categories to which the commodities belong. Accordingly, the customer can utilize the print as it is as a record of household accounts.

The settlement POS terminal 52 performs final settlement of accounts for purchased commodities similarly to the settlement POS terminals 22, 32 and 42 in the first to third embodiments.

The settlement POS terminal 52 includes a communication control section 52a which receives detailed data as a result of sorting processing for purchased commodity data from the communication control section 53a of the controller 53.

The settlement POS terminal 52 further includes a price lookup file search section 52b, a calculation processing section 52d, a transactions log file control section 52e, a price lookup file 52g, a display section 52h and a transactions log file 52i, which have similar functions to those of the price lookup file search section 42b, the calculation processing section 42c, the transactions log file control section 42d, the price lookup file 42f, the display section 42g and the transactions log file 42i, respectively, of the settlement POS terminal 42 in the third embodiment described above.

Accordingly, for example, the display section 52h can display in such a displaying form as shown in FIG. 17 in the third embodiment described above.

The settlement POS terminal 52 further includes an inquiring control section 52c which transmits, when the price lookup file search section 52b tries to retrieve commodity code information of a commodity code which has not been stored in the price lookup file 52g, an inquiring telegram to the communication control section 53a of the controller 53 so that commodity price information of the commodity code may be retrieved from the price lookup file 53k of the controller 53.

The settlement POS terminal 52 further includes a print control section 52f which controls a printing section 52j to print a result of sorting processing including the total amount of money, the consumption tax and the grand total stored in the transactions log file 52i.

Accordingly, for example, the printing section 52j can display in such a displaying form as shown in FIG. 18 in the third embodiment described above under the control of the print control section 52f.

Operation of the POS system according to the fourth embodiment of the present invention having the construction described above will be described with reference to FIGS. 25 to 27.

Figure 25:
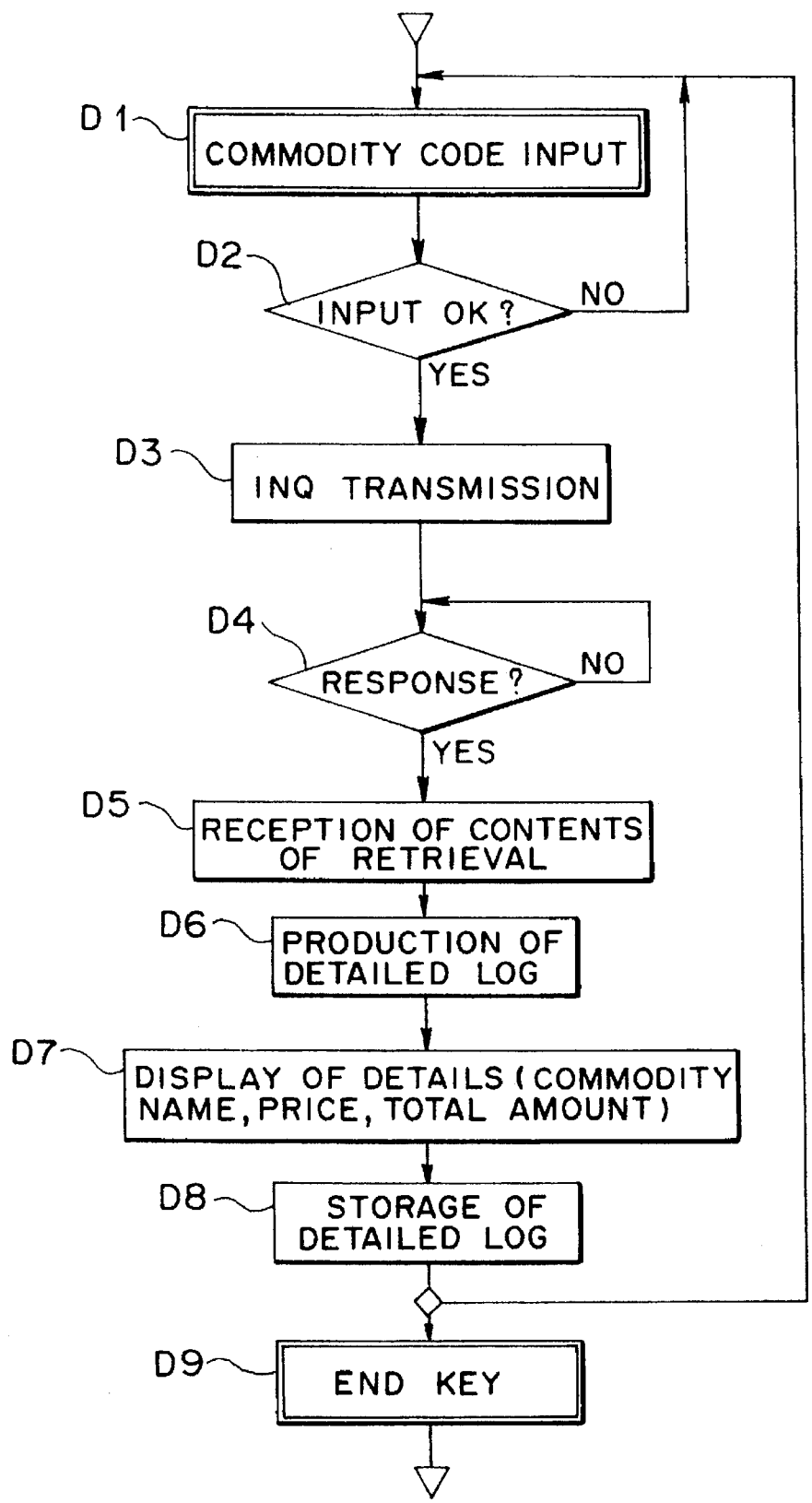
FIG. 25 is a flow chart illustrating operation of a shopping cart employed in the POS system shown in FIG. 23.

Referring first to FIG. 25, a customer will perform a reading operation of a commodity code such as bar code information by means of the scanner 51b or the keyboard 51c (step D1). If a commodity code is read correctly at step D2, then the inquiring control section 51e transmits an inquiring telegram (INQ) as commodity code information, for which a reading operation has been performed, to the controller 53 (step D3). But on the contrary if the commodity code has not been read correctly, a commodity code reading operation will be performed again at step D1.

Then, after an inquiring telegram is transmitted to the controller 53 at step D3, commodity price information retrieved in accordance with the commodity code information as well as the consumption tax, the total amount of money and so forth are received as a response signal from the controller 53 (steps D4 and D5). Then, using the commodity name and the price of the commodity as well as the consumption tax, the total amount of money and so forth, a detailed log file as purchased commodity data is produced (step D6), displayed on the display section 51g (step D7) and stored into the detailed log file 51h (step D8).

Then, if the reading operations of commodity codes for the object of purchasing of commodities by the customer is completed, such completion is notified to the controller 53 by operation of the keyboard 51c (step D9).

Figure 26:
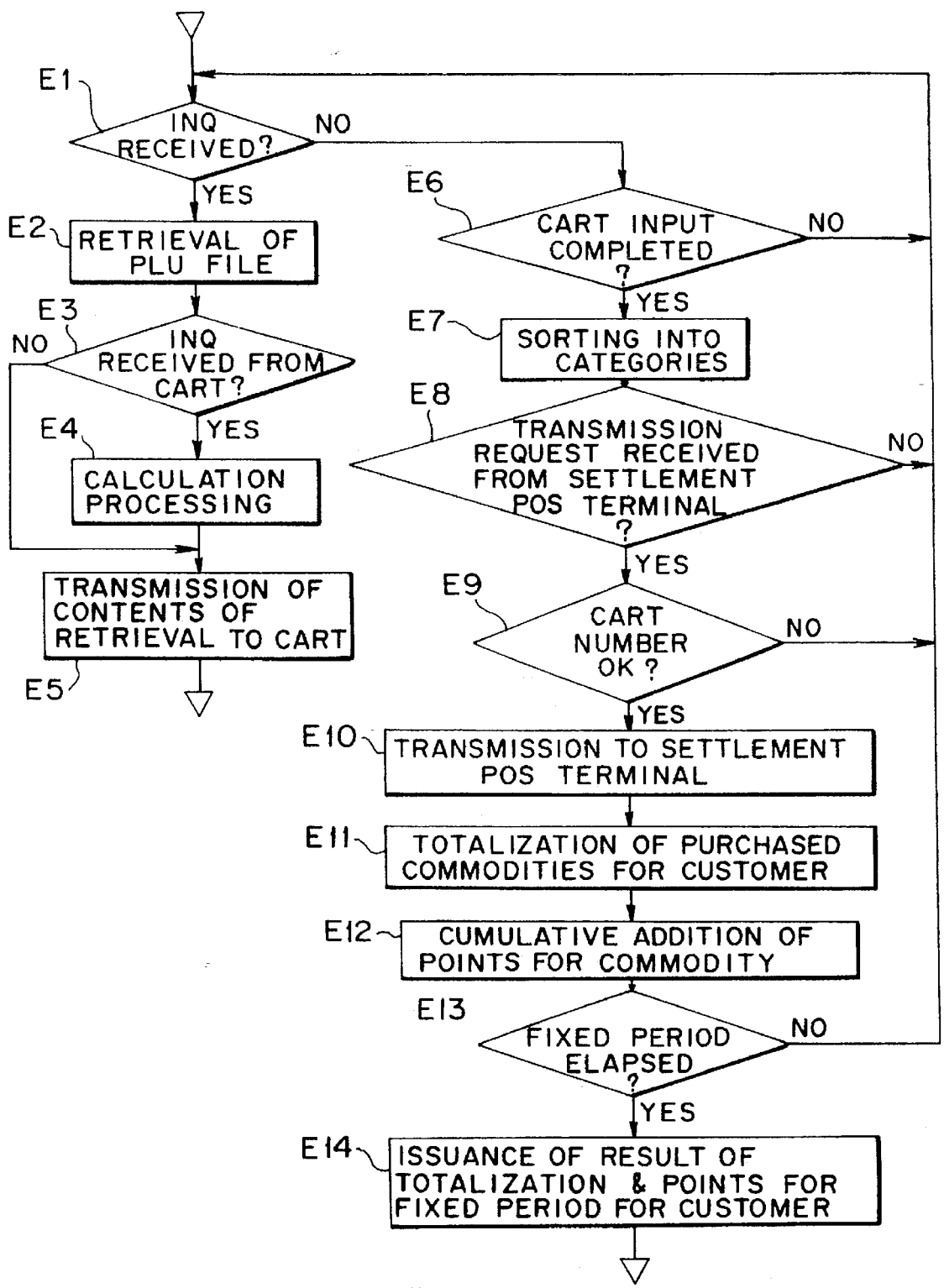
FIG. 26 is a flow chart illustrating operation of the controller of the POS system shown in FIG. 23.
Figure 27:
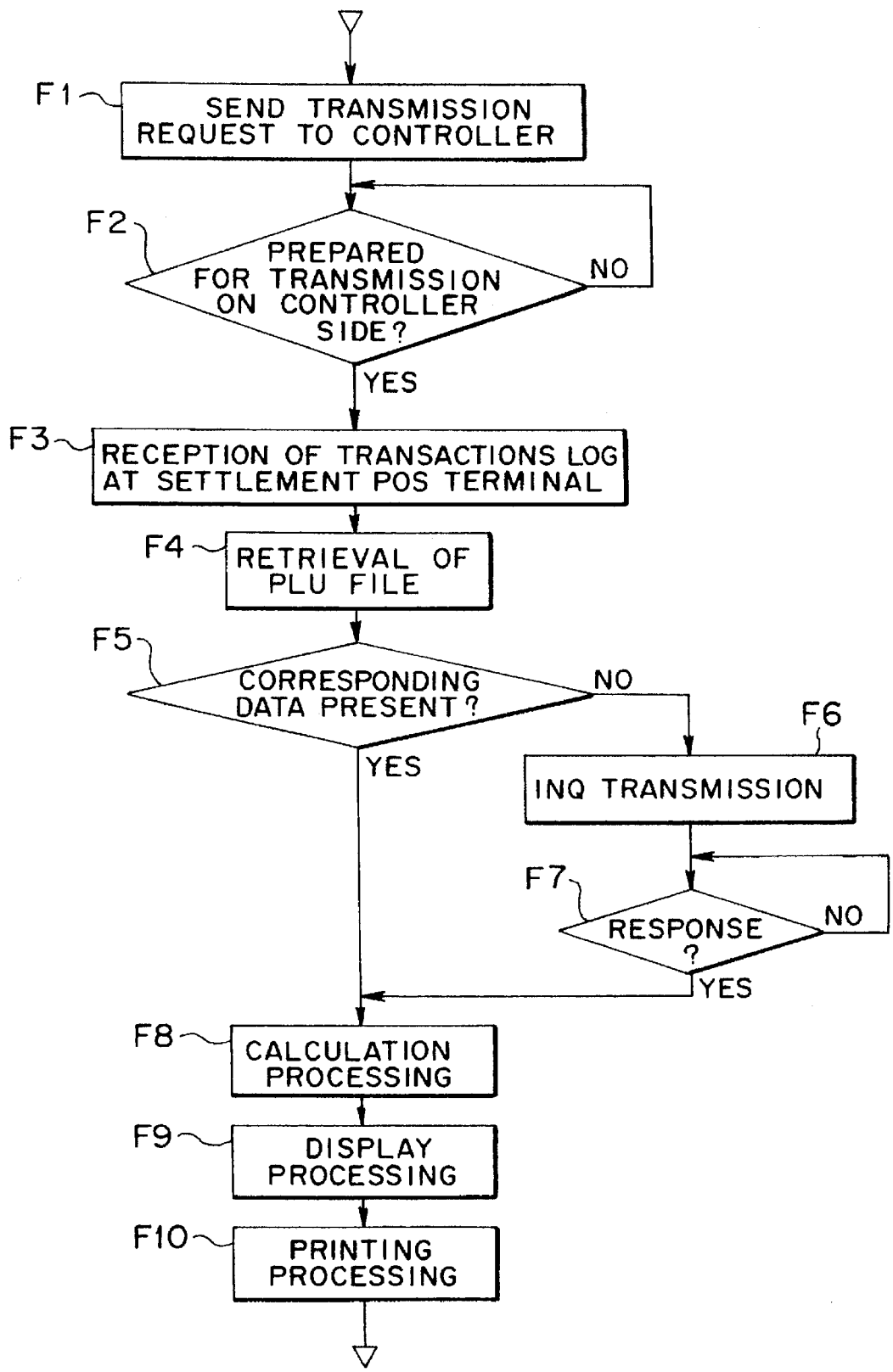
FIG. 27 is a flow chart illustrating operation of a settlement POS terminal employed in the POS system shown in FIG. 23.

Then, on the controller 53 side, processing illustrated in FIG. 26 is executed. In particular, referring to FIG. 26, after the inquiring telegram from the shopping cart 51 is received (step E1), the price lookup file search section 53b refers to the price lookup file 53k to retrieve the commodity name and the commodity price corresponding to the price code information (step E2).

Then, if the inquiring telegram originates from the shopping cart 51 (step E3), then the calculation processing section 53d calculates the total amount of money, the consumption tax and so forth (step E4), and the commodity name and the commodity price retrieved by the price lookup file search section 53b and the total amount of money, the consumption tax and so forth calculated by the calculation processing section 53d are transmitted to the shopping cart 51 (step E5).

It is to be noted that, if it is determined at step E3 that the inquiring telegram received does not originate from the shopping cart 51 but from the settlement POS terminal 52, then the total amount of money, the consumption tax and so forth are not calculated and the commodity name and the commodity price retrieved by the price lookup file search section 53b are transmitted to the settlement POS terminal 52 (step E5), and those data are stored as purchased commodity data into the transactions log file 53m.

On the other hand, if no inquiring telegram is received at step E1 and an end of a commodity code reading operation is thereafter not notified from the keyboard 51c of the shopping cart 51, then the inquiring telegram waiting condition (step E1) is entered again. However, conversely if an end of a commodity code reading operation is notified, then the sorting processing section 53e sorts the purchased commodity data stored in the transactions log file 53m into categories to which the commodity codes belong (step E7), and a result of the sorting is stored into the transactions log file 52m.

Then, when the transactions data transmission control section 53f receives, from the settlement POS terminal 52, a request for transmission of the purchased commodity data after the sorting processing stored in the transactions log file 52m (step E8), it checks the identification number of the shopping cart 51 requested from the settlement POS terminal 52 (step E9), and then the purchased commodity data are transmitted (step E10).

When the purchased commodity data are transmitted to and settled by the settlement POS terminal 52 and settlement of the accounts is completed, one transactions is completed thereby. Then, the purchased commodity totalization control section 53g controls the purchased commodity totalization file 53p to totalize the purchased commodity data, with which the transaction has completed, for the unique customer information (step E11), and the point addition section 53h converts the amount of money for the purchased commodities in the transaction into a point number and cumulatively adds the point number (step E12).

Thereafter, when the fixed period of time elapses on the period management section 53i (step E13), the totalization result/point addition edition section 53j edits the totalized purchased commodity data and the cumulatively added point number for the unique customer information and the issuance section 53n issues a print indicating them (step E14).

Subsequently, processing operation of the settlement POS terminal 52 will be described. In particular, referring to FIG. 27, in order for the customer to effect final settlement of accounts for the commodities to be purchased with the settlement POS terminal 52, the communication control section 52a of the settlement POS terminal 52 requests the controller 53 for transmission of purchased commodity data (transactions log) (step F1).

Then, after the controller 53 is prepared for transmission of the purchased commodity data (step F2), the purchased commodity data are received by the communication control section 52a (step F3).

The price lookup file search section 52b refers to the price lookup file 52g to retrieve the commodity prices and the commodity names corresponding to the commodity codes in accordance with the purchased commodity data (step F4). When the commodity price information and the commodity name information corresponding to an inputted commodity code are not stored in the price lookup file 52g (step F5), an inquiring telegram is transmitted to the controller 53 so that retrieval may be performed by the controller 53 referring to the price lookup file 53k of the controller 53 (step F6).

When the commodity names and the commodity prices are retrieved at step F4 referring to the price lookup file 52g (step F5) or when the commodity names and the commodity prices are retrieved referring to the price lookup file 53k of the controller 53 (step F7), the calculation processing section 52d calculates the total amount of money, the consumption tax and so forth (step F8). The transactions data including the total amount of money and the transactions are displayed on the display section 52h (step F9), printed as a receipt by the printing section 52j (step F10), and stored into the transactions log file 52i.

In this manner, with the POS system according to the fourth embodiment of the present invention, the advantages achieved by the POS systems of the first and third embodiments are achieved. In addition, since purchased commodity data can be issued after each fixed period of time in a form arranged for categories to which the commodities belong, the POS system is advantageous in that the customer can get static data to be recorded into a record of household accounts, which is convenient to the customer.

It is to be noted that, while price retrieval processing which has been performed by the controller 53 is performed at the settlement POS terminal 52 in the present embodiment, alternatively the settlement POS terminal 52 may utilize a result of such price retrieval from the controller 53 as it is.

Further, the window displaying processing for particular screen information in the POS system of the second embodiment may be applied to the POS system of the present embodiment.

f. Others

While price retrieval is performed, where a commodity price file is not provided on each shopping cart in any of the POS systems of the first, second and fourth embodiments and a customer performs a reading operation of a commodity code, using a commodity price file provided in a controller or a settlement POS terminal, where such commodity price file is provided on each shopping cart and a customer performs a reading operation of a commodity code, price retrieval may alternatively be performed using the commodity price file of the shopping cart.

The present invention is not limited to the specifically described embodiment, and variations and modifications may be made without departing from the scope of the present invention.

What is claimed is:

1. A point of sale system, comprising:

a purchased commodity accommodating and transporting means having a scanning function and including at least one of a commodity code reading section for reading a commodity code applied to a commodity, an accommodation section for accommodating therein a commodity whose commodity code has been read by said commodity code reading section, and an inputting section for inputting at least information substantially unique to a user;

a commodity price file, operably coupled to said purchased commodity accommodating and transporting means, for accommodating price information of commodities corresponding to commodity codes;

a settlement POS terminal for performing final settlement of accounts for purchased commodities accommodated in said accommodation section of said purchased commodity accommodating and transporting means, said settlement POS terminal including a receipt issuance section for issuing a result of the settlement of accounts as a receipt;

a control means, operably coupled to said purchased commodity accommodating and transporting means and to said settlement POS terminal, for controlling said purchased commodity accommodating and transporting apparatus and said settlement POS terminal, said control means further controlling said settlement POS terminal for intermittently issuing said result of the settlement; and a sorting processing section, operably coupled to said commodity price file, for sorting, at a point of time when reading of commodity codes by said commodity code reading section of said purchased commodity accommodating and transporting means is completed, purchased commodity data related to prices of the commodities obtained by retrieval of said commodity price file based on the commodity code information read by said commodity code reading section arranged into commodity categories to which the commodities belong, wherein said receipt issuance section of said settlement POS terminal, operably coupled to said sorting processing section, issues a result of the sorting processing by said sorting processing section as a receipt.

2. The point of sale (POS) system as claimed in claim 1, wherein said sorting processing section is provided in said control means, and said control means includes a data transmission section for transmitting the result of the sorting processing by said sorting processing section to said settlement POS terminal.

3. The point of sale (POS) system as claimed in claim 2, wherein said purchased commodity accommodating and transporting means includes a customer information inputting section for inputting information unique to a customer who utilizes said purchased commodity accommodating and transporting means, and said control means includes a purchased commodity data storage section for storing, for unique information to each customer from said customer information inputting section of said purchased commodity accommodating and transporting means, purchased commodity data of the customer in accordance with the result of the sorting by said sorting processing section, a period determination section for determining lapse of a fixed period of time, and a purchased commodity data issuance section operable when it is determined by said period determination section that the fixed period of time has elapsed by issuing purchased commodity data for the fixed period of time stored in said purchased commodity data storage section in accordance with the unique information of the customer.

4. The point of sale (POS) system as claimed in claim 2, wherein said purchased commodity accommodating and transporting means includes a customer information inputting section for inputting information unique to a customer who utilizes said purchased commodity accommodating and transporting means, and said control apparatus includes a point number storage section for converting, for unique information to each customer from said customer information inputting section of said purchased commodity accommodating and transporting means, a total amount of money for each one transaction of the customer into a point number and cumulatively storing the point number, a period determination section for determining lapse of a fixed period of time, and a point number issuance section operable when it is determined by said period determination section that the fixed period of time has elapsed for issuing a total point number for the fixed period of time stored in said point storage section in a corresponding relationship to the peculiar information of the customer.

5. The point of sale (POS) system as claimed in claim 4, wherein said control apparatus includes a purchased commodity data storage section for storing, for unique information to each customer from said customer information inputting section of said purchased commodity accommodating and transporting means, purchased commodity data of the customer in accordance with the result of the sorting by said sorting processing section, and a purchased commodity data issuance section operable when it is determined by said period determination section that the fixed period of time has elapsed for issuing purchased commodity data for the fixed period of time stored in said purchased commodity data storage section in accordance with the unique information of the customer.

6. The point of sale (POS) system as claimed in claim 1, wherein said sorting processing section is provided in said purchased commodity accommodating and transporting means, and said purchased commodity accommodating and transporting means includes a data transmission section for transmitting the result of the sorting processing by said sorting processing section to said settlement POS terminal.

7. The point of sale (POS) system as claimed in claim 6, wherein said commodity price file is provided in said purchased commodity accommodating and transporting means.

8. The point of sale (POS) system as claimed in claim 6 or 7, wherein said purchased commodity accommodating and transporting means includes a customer information inputting section for inputting unique information to a customer who utilizes said purchased commodity accommodating and transporting means, and said control means includes a point number storage section for converting, for unique information to each customer from said customer information inputting section of said purchased commodity accommodating and transporting means, a total amount of money for each one transaction of the customer into a point number and cumulatively storing the point number, a period determination section for determining lapse of a fixed period of time, and a point number issuance section operable when it is determined by said period determination section that the fixed period of time has elapsed for issuing a total point number for the fixed period of time stored in said point storage section in a corresponding relationship to the unique information of the customer.

9. A point of sale (POS) system, comprising:
a purchased commodity accommodating and transporting means having a scanning function and including at least one of a commodity code reading section for reading a commodity code applied to a commodity, an accommodation section for accommodating therein a commodity whose commodity code has been read by said commodity code reading section, and an inputting section for inputting at least information substantially unique to a user;
a commodity price file, operably coupled to said purchased commodity accommodating and transporting apparatus, for accommodating price information of commodities corresponding to commodity codes;
a settlement POS terminal for performing final settlement of accounts for purchased commodities accommodated in said accommodation section of said purchased commodity accommodating and transporting apparatus;
a control means, operably coupled to said purchased commodity accommodating and transporting means and to said settlement POS terminal, for controlling said purchased commodity accommodating and transporting means and said settlement POS terminal, said control means further controlling said settlement POS terminal for intermittently issuing a settlement result; and
a display section provided on said purchased commodity accommodating and transporting means for displaying prices of commodities obtained by retrieval of said commodity price file in accordance with commodity code information read by said commodity code reading section and a total value of the prices of the commodities,
wherein said purchased commodity accommodating and transporting means includes a screen information holding section for holding information of a plurality of particular screens, and a display control section, operably coupled to said display section and said screen information holding section, for controlling said display section to display the information of at least one of the plurality of particular screens held in said screen information holding section by window display.

10. The point of sale (POS) system as claimed in claim 9, wherein the information of the plurality of particular screens held in said screen information holding section are read in from said control means.

11. The point of sale (POS) system as claimed in claim 9, wherein the information of the plurality of particular screens held in said screen information holding section are read in from an external storage medium loaded on said purchased commodity accommodating and transporting means.

12. The point of sale (POS) system as claimed in claim 9, wherein said purchased commodity accommodating and transporting means further includes a screen information retrieval section for retrieving from said screen information holding section the information of that one of the particular screens which relates to commodity code information read by said commodity code reading section, the information of the particular screen retrieved by said screen information retrieval section being displayed by window display on said display section under the control of said display control section.

13. The point of sale (POS) system as claimed in claim 9, wherein said screen information holding section is constructed as a group information holding section which holds, for each of a plurality of commodity categories to which commodities belong, information of a plurality of particular screens relating to the commodity category as a group, and said screen information retrieval section retrieves, from said group information holding section, that one of the groups of information of particular screens which relates to a commodity category to which commodity code information read by said commodity code reading section belongs whereas said display control section controls said display section to successively display the information of the particular screens of the particular screen information group.

14. A point of sale (POS) system, comprising:
a purchased commodity accommodating and transporting means having a scanning function and including at least one of a commodity code reading section for reading a commodity code applied to a commodity, an accommodation section for accommodating therein a commodity whose commodity code has been read by said commodity code reading section, and an inputting section for inputting at least information substantially unique to a user;

a commodity price file, operably coupled to said commodity code reading section, for accommodating price information of commodities corresponding to commodity codes;

a settlement POS terminal for performing final settlement of accounts for purchased commodities accommodated in said accommodation section of said purchased commodity accommodating and transporting means;

a control means, operably coupled to said purchased commodity accommodating and transporting means and to said settlement POS terminal, for controlling said purchased commodity accommodating and transporting means and said settlement POS terminal, said control means further controlling said settlement POS terminal for intermittently issuing a settlement result; and a display section, operably coupled to said purchased commodity accommodating and transporting means, for displaying prices of commodities obtained by retrieval of said commodity price file in accordance with commodity code information read by said commodity code reading section and a total value of the prices of the commodities, wherein said purchased commodity accommodating and transporting means includes (a) an inputting section for inputting, by a customer, a purchase estimate of the customer when the customer starts use of said purchased commodity accommodating and transporting apparatus, (b) a comparison section, operably coupled to said inputting section, for comparing the purchase estimate inputted from said inputting section and the total value of the prices of the commodities, and (c) an excess notification section, operably coupled to said comparison section, operable when it is determined by said comparison section that the total value of the prices of the commodities exceeds the purchase estimate inputted from said inputting section for causing said display section to display the determination in order to notify the determination to the customer.

15. The point of sale (POS) system as claimed in claim 14, wherein said inputting section is constructed as ten keys of a touch sensor type displayed on said display section.

* * * * *